(12) United States Patent
Dudar

(10) Patent No.: US 11,560,823 B2
(45) Date of Patent: Jan. 24, 2023

(54) SYSTEMS AND METHODS TO MITIGATE GASOLINE PARTICULATE FILTER PRESSURE SENSOR DEGRADATION

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 87 days.

(21) Appl. No.: 17/303,026

(22) Filed: May 18, 2021

(65) Prior Publication Data

US 2021/0270176 A1 Sep. 2, 2021

Related U.S. Application Data

(62) Division of application No. 15/918,833, filed on Mar. 12, 2018, now Pat. No. 11,060,437.

(51) Int. Cl.
  *F01N 9/00* (2006.01)
  *F01N 3/023* (2006.01)
  *F01N 11/00* (2006.01)
  *F02D 41/22* (2006.01)

(52) U.S. Cl.
  CPC ............. *F01N 9/002* (2013.01); *F01N 3/023* (2013.01); *F01N 11/002* (2013.01); *F02D 41/222* (2013.01); *F02D 2250/06* (2013.01)

(58) Field of Classification Search
  None
  See application file for complete search history.

(56) References Cited

U.S. PATENT DOCUMENTS

| | | | |
|---|---|---|---|
| 5,609,021 A * | 3/1997 | Ma | F01N 3/22 60/285 |
| 6,230,487 B1 | 5/2001 | Blumenstock et al. | |
| 9,151,205 B2 | 10/2015 | Huq et al. | |
| 2009/0025371 A1 * | 1/2009 | Hermansson | F01N 3/2033 290/1 A |
| 2009/0133385 A1 * | 5/2009 | Ono | F01N 9/002 60/287 |
| 2011/0252961 A1 | 10/2011 | Brahma et al. | |
| 2012/0227382 A1 * | 9/2012 | Bidner | F01N 3/101 60/274 |
| 2016/0376972 A1 | 12/2016 | Hagimoto et al. | |
| 2018/0066595 A1 | 3/2018 | Dudar et al. | |

FOREIGN PATENT DOCUMENTS

WO 9308382 A1 4/1993

* cited by examiner

Primary Examiner — Todd Melton
Assistant Examiner — Jason R Roberson
(74) Attorney, Agent, or Firm — Vincent Mastrogiacomo; McCoy Russell LLP

(57) ABSTRACT

Methods and systems are provided for regenerating a particulate filter positioned in an exhaust system of an engine of a vehicle. In one example, a method comprises obtaining a first air flow in an intake of the engine and obtaining a second air flow in the intake of the engine, where regeneration of the particulate filter is conducted in response to the first air flow differing from the second air flow by at least a threshold amount, where the first air flow and the second air flow comprise air flow routed from the exhaust system to the intake of the engine. In this way, the particulate filter may be regenerated under conditions where a loading state of the particulate filter is not known.

10 Claims, 10 Drawing Sheets

SYSTEMS AND METHODS TO MITIGATE GASOLINE PARTICULATE FILTER PRESSURE SENSOR DEGRADATION

CROSS REFERENCE TO RELATED APPLICATION

The present application is a divisional of U.S. Non-Provisional patent application Ser. No. 15/918,833, entitled "SYSTEMS AND METHODS TO MITIGATE GASOLINE PARTICULATE FILTER PRESSURE SENSOR DEGRADATION," and filed on Mar. 12, 2018. The entire contents of the above-referenced application are hereby incorporated by reference for all purposes.

FIELD

The present description relates generally to methods and systems for controlling a vehicle engine to regenerate a gasoline particulate filter under conditions where a differential pressure sensor coupled to the gasoline particulate filter is degraded.

BACKGROUND/SUMMARY

In some direct injection gasoline-powered engines, gasoline particulate filters (GPF) are included in an exhaust after-treatment system to collect soot from the combustion process. A differential pressure sensor across the GPF is used to measure pressure across the GPF, and if the pressure difference across the GPF is above a threshold, then the GPF is regenerated via onboard strategy. However, there may be modes where the delta pressure sensor may be inaccurate, such as due to degradation. Under such conditions it may be challenging for onboard strategy to determine when to regenerate the GPF. Such a situation may result in the GPF becoming clogged with soot, which may result in degraded driving operation, and an increase in tailpipe emissions. Thus, systems and methods for determining a loading state of the GPF under conditions where the differential pressure sensor is degraded, is desired.

The inventors herein have recognized the above-mentioned issues and desires, and have developed systems and methods to address them. In one example, a method comprises regenerating a particulate filter positioned in an exhaust system of an engine of a vehicle in response to a first air-flow in an intake of the engine differing from a second air-flow in the intake of the engine by at least a threshold amount, the air flows including air-flow routed from the exhaust system to an engine intake through the engine. In this way, the particulate filter may be regenerated under conditions in which the differential pressure sensor is determined to not be functioning as desired or expected. Such action may reduce engine degradation, may improve emissions, and may increase engine life-time.

In an example of the method, the first air-flow may comprise a baseline intake air-flow obtained under conditions where the particulate filter is known to be loaded less than a threshold loading state. The second air-flow may comprise a test intake air flow, obtained under conditions where a differential pressure sensor coupled to the particulate filter is known to be degraded. Furthermore, in one example, the first air-flow and the second air-flow may be obtained via rotating the engine unfueled in reverse, whereas in another example the first air-flow and the second air-flow may be obtained via rotating an electric booster positioned in the engine intake, in reverse. The particulate filter may comprise one of a gasoline particulate filter or a diesel particulate filter, for example.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
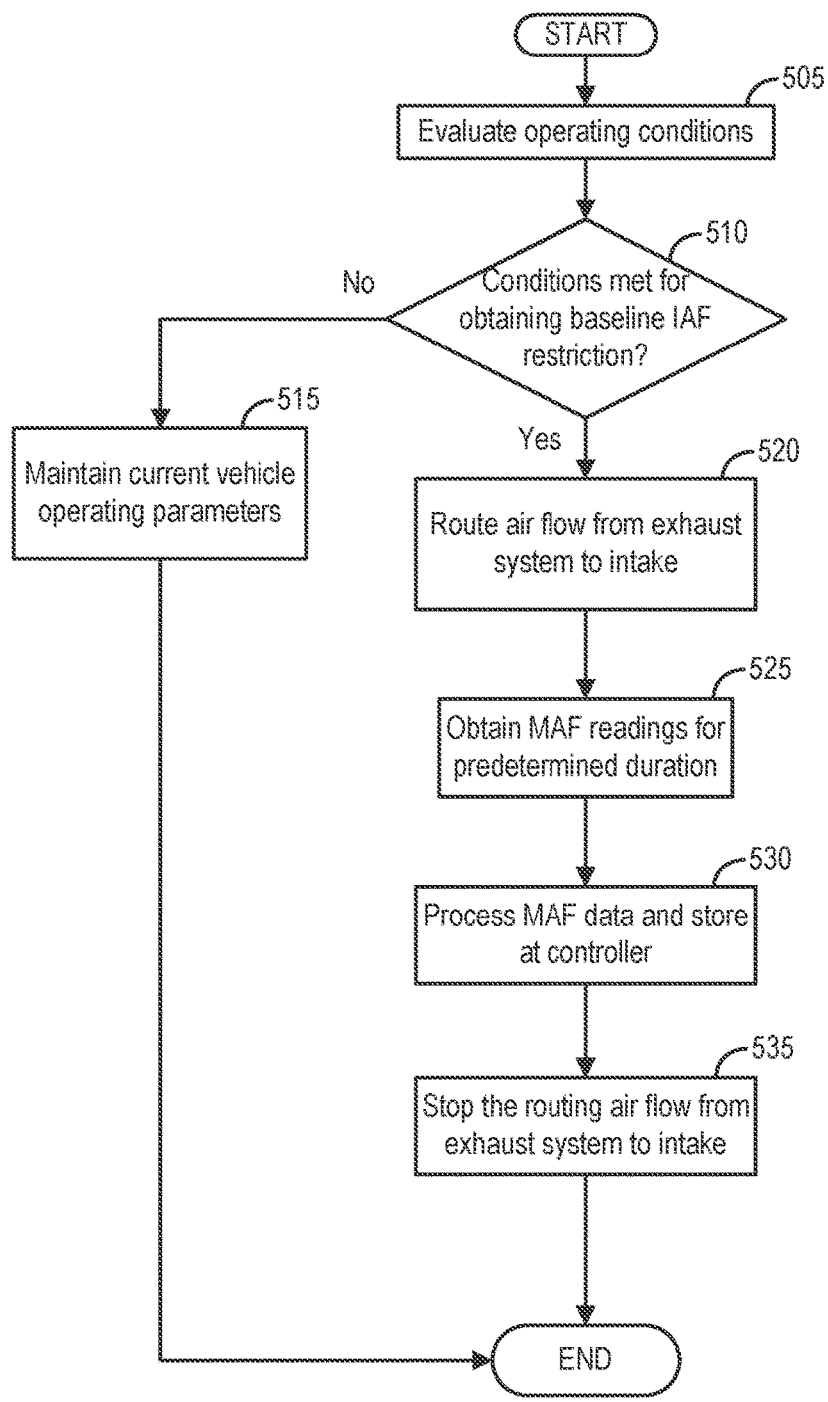
FIG. 5 depicts a high-level example method for obtaining baseline air flow in an intake system of an engine under conditions where a GPF is substantially clean.
Figure 6:
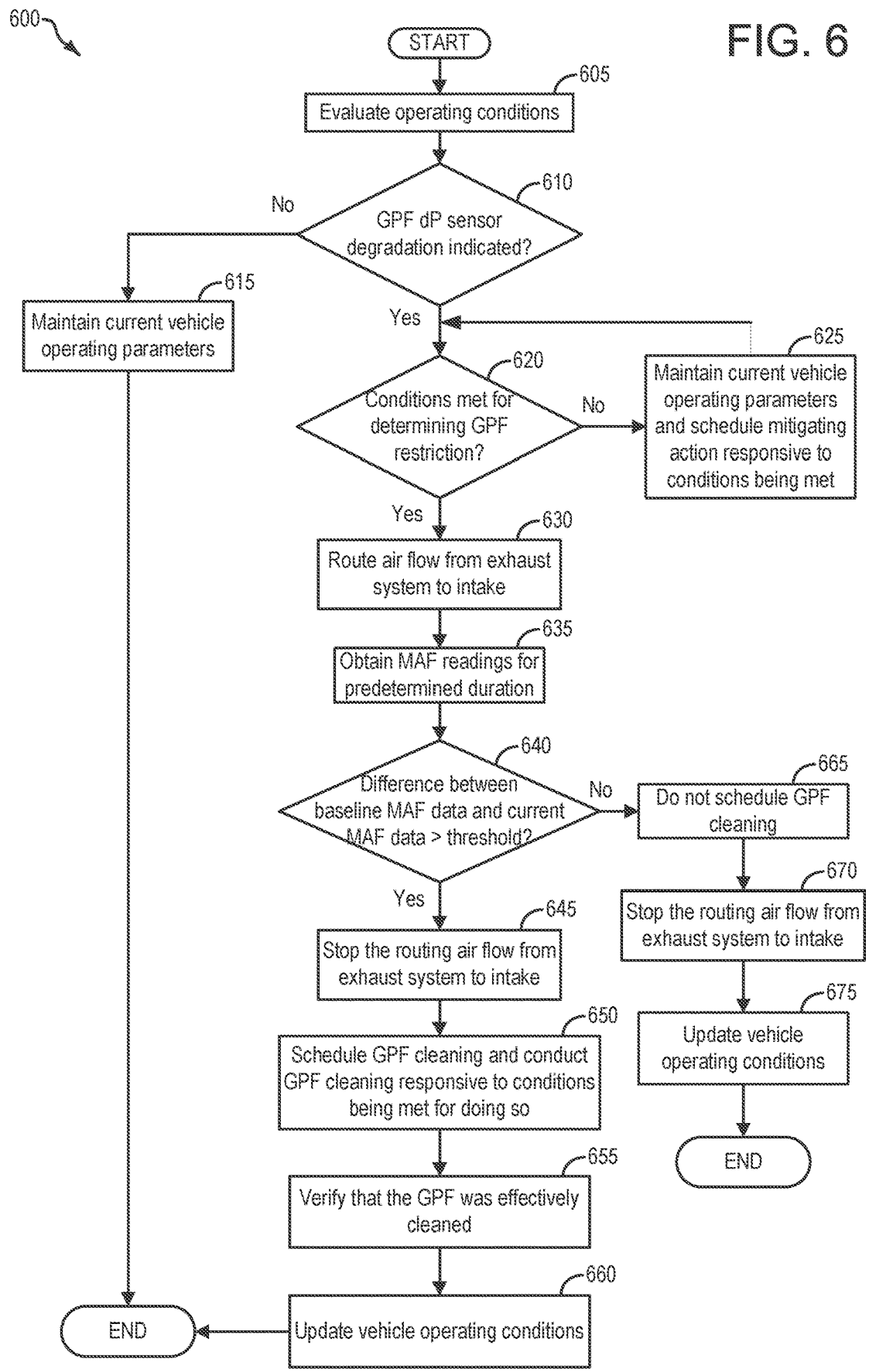
FIG. 6 depicts a high-level example method for determining whether to regenerate the GPF under conditions where a GPF differential pressure sensor is degraded.
Figure 7:
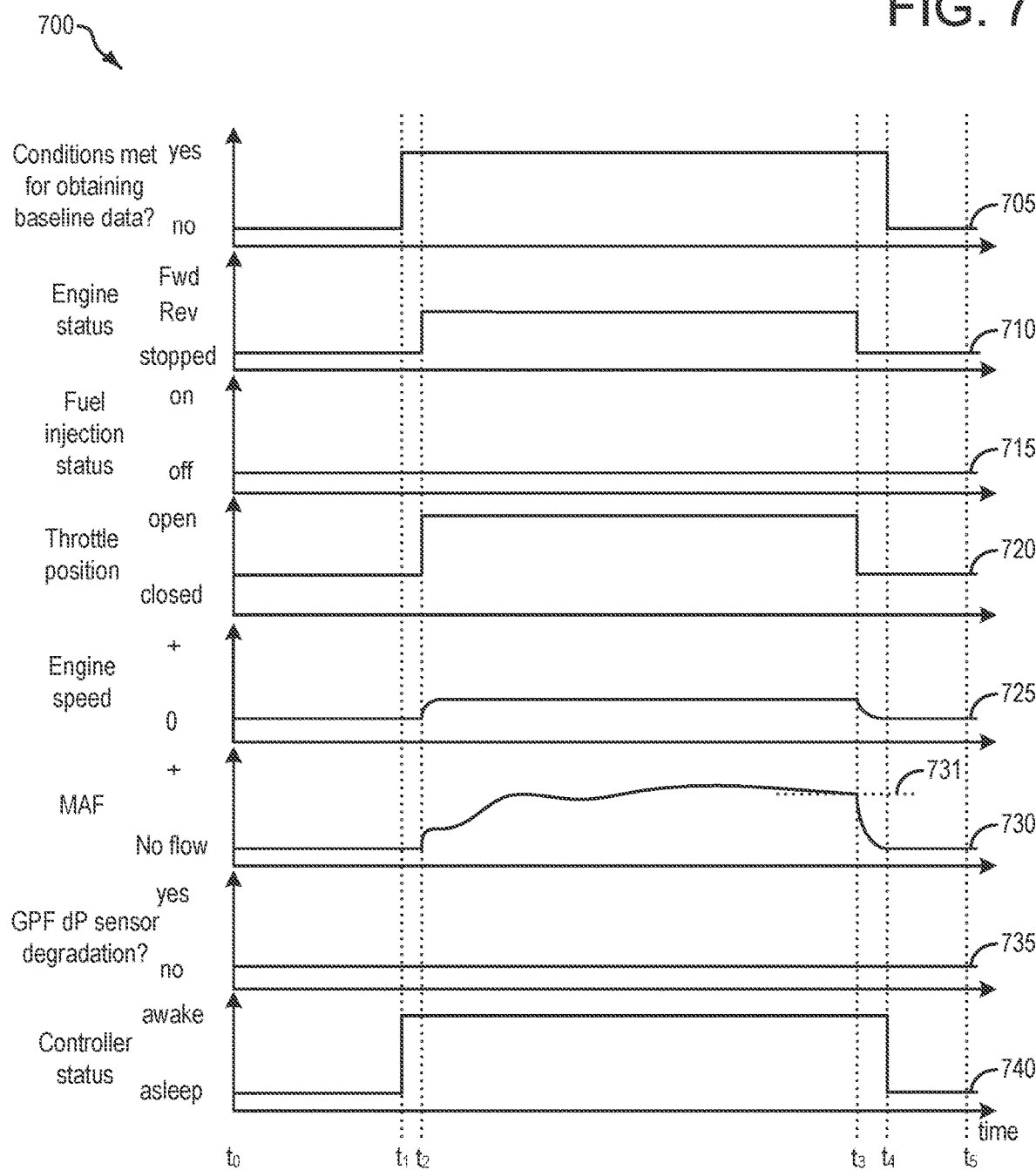
FIG. 7 depicts an example timeline for obtaining the baseline air flow via rotating an engine unfueled in reverse.
Figure 8:
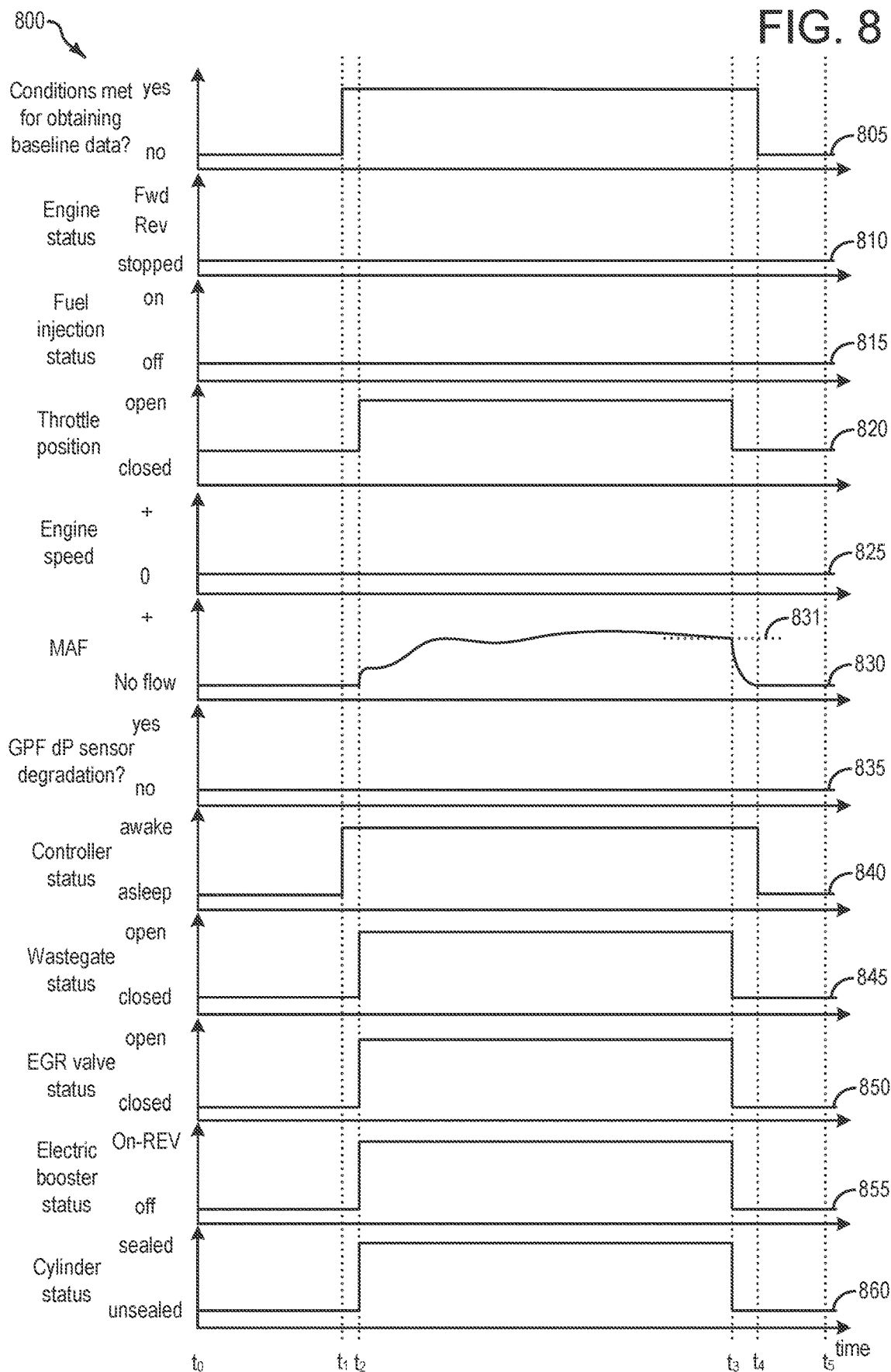
FIG. 8 depicts an example timeline for obtaining the baseline air flow via operating an electric booster positioned in the intake, in reverse.
Figure 9:
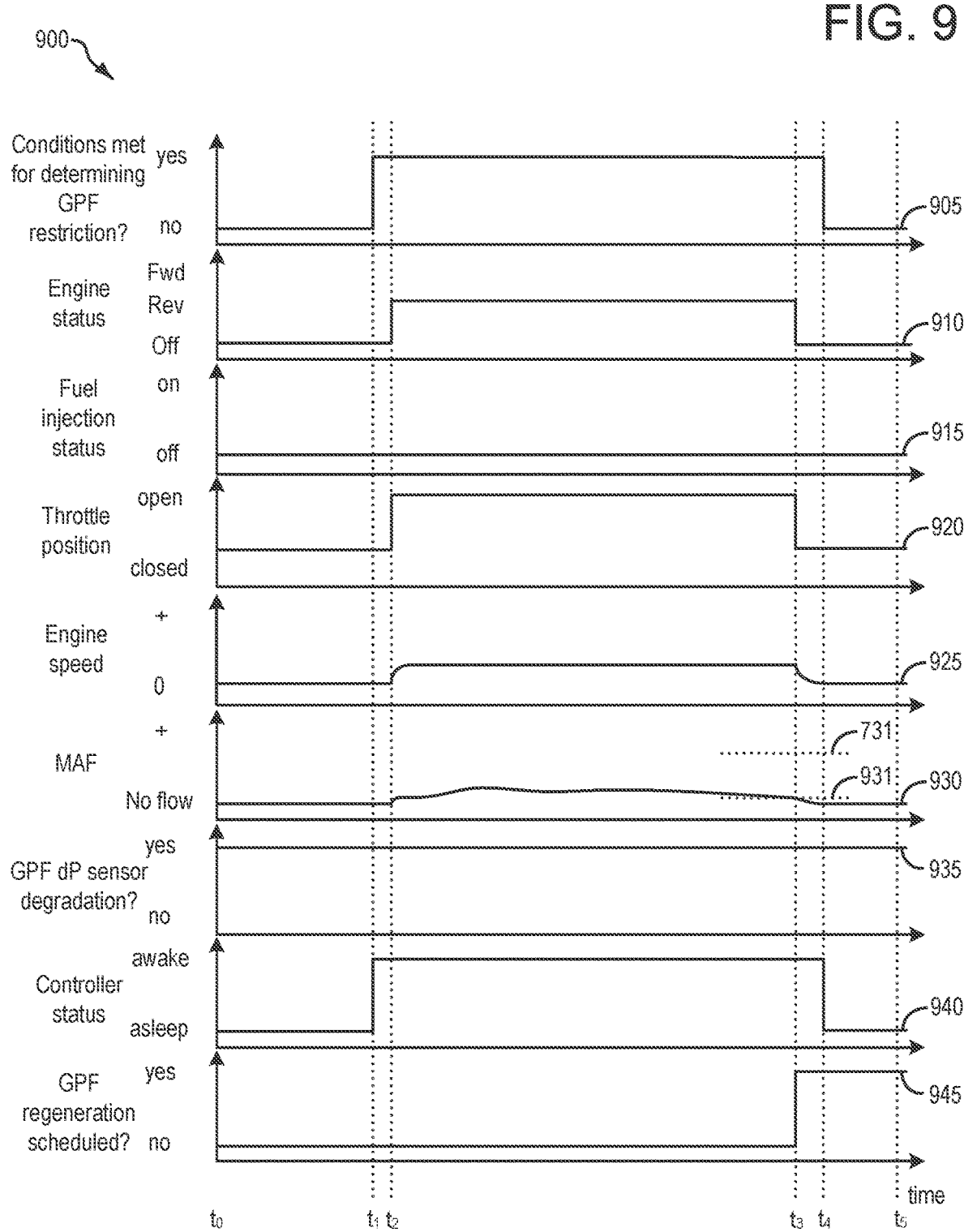
FIG. 9 depicts an example timeline for determining whether to regenerate the GPF via rotating the engine unfueled in reverse.
Figure 10:
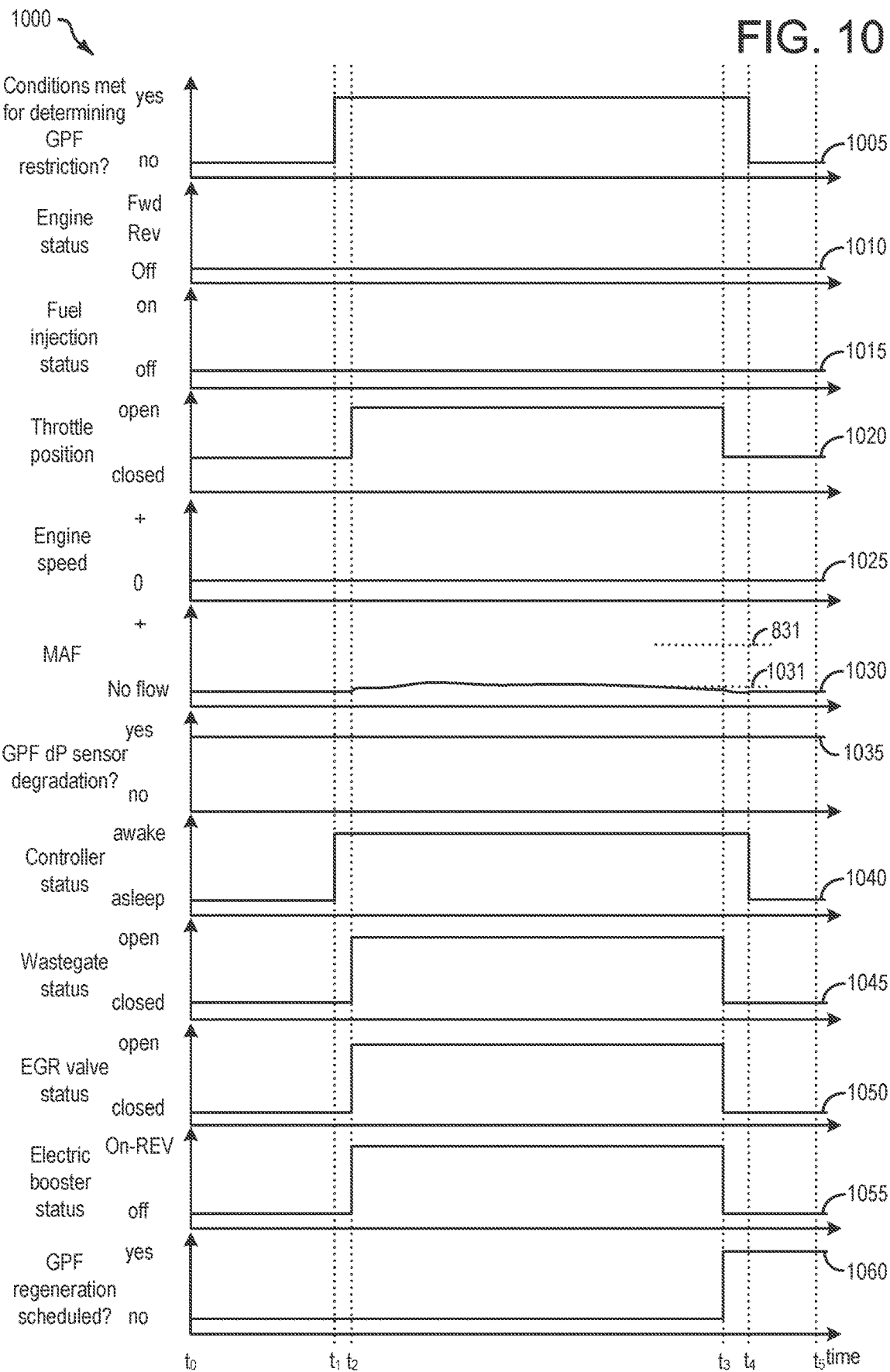
FIG. 10 depicts an example timeline for determining whether to regenerate the GPF via operating the electric booster in reverse.

The following description relates to systems and methods for improving engine operation for vehicles which have a gasoline particulate filter (GPF), or in some examples, a diesel particulate filter (DPF) positioned in an exhaust system of the engine. More specifically, improving engine operation may relate to improving engine operation by enabling regeneration procedures of the GPF (or in some examples DPF) under conditions where a differential pressure sensor configured to indicate a loading state, or restriction level, of the GPF, is degraded or otherwise not functioning as desired. Enabling regeneration procedures under conditions where the differential pressure sensor is degraded may comprise routing air flow from the exhaust system to engine intake, where air flow in the engine intake is used to indicate a level of restriction of the GPF (or in some examples DPF). Such routing of air flow may involve rotation of the engine in reverse, or may involve rotation in reverse of an electric booster positioned in engine intake, in reverse. Accordingly, such routing may be conducted in a hybrid vehicle, such as the hybrid vehicle system depicted at FIG. 1. Rotating the engine in reverse to route air flow from the exhaust system to engine intake, may be accomplished via an engine system such as that depicted at FIG. 2. Alternatively, routing air flow from the exhaust system to engine intake via the electric booster may be accomplished via an engine system such as that depicted at FIG. 3. Rotating the engine in reverse, or operating the electric booster in reverse to route air flow from the exhaust system to engine intake may involve use of an H-bridge circuit, such as the H-bridge circuit depicted at FIGS. 4A-4B. Determining a level of restriction of the GPF (or in some examples DPF) may include first obtaining baseline intake air flow measurements under conditions where the GPF is known to be substantially clean (e.g. loaded with soot and/or other particulate less than 5% of a capacity of the GPF/DPF), and then at a later time, when the differential pressure sensor is indicated to be degraded, obtaining test measurements of intake air flow, for comparison to the baseline intake air flow measurements. Accordingly, a method for obtaining the baseline intake air flow measurements is depicted at FIG. 5, and a method for obtaining the test intake air flow measurements is depicted at FIG. 6. A timeline for obtaining baseline intake air flow measurements via rotating the engine in reverse is depicted at FIG. 7, whereas a timeline for obtaining baseline intake air flow measurements via rotating the electric booster in reverse, is depicted at FIG. 8. A timeline for obtaining test intake air flow measurements via rotating the engine in reverse is depicted at FIG. 9, whereas a timeline for obtaining test intake air flow measurements via rotating the electric booster in reverse, is depicted at FIG. 10.

Figure 1:
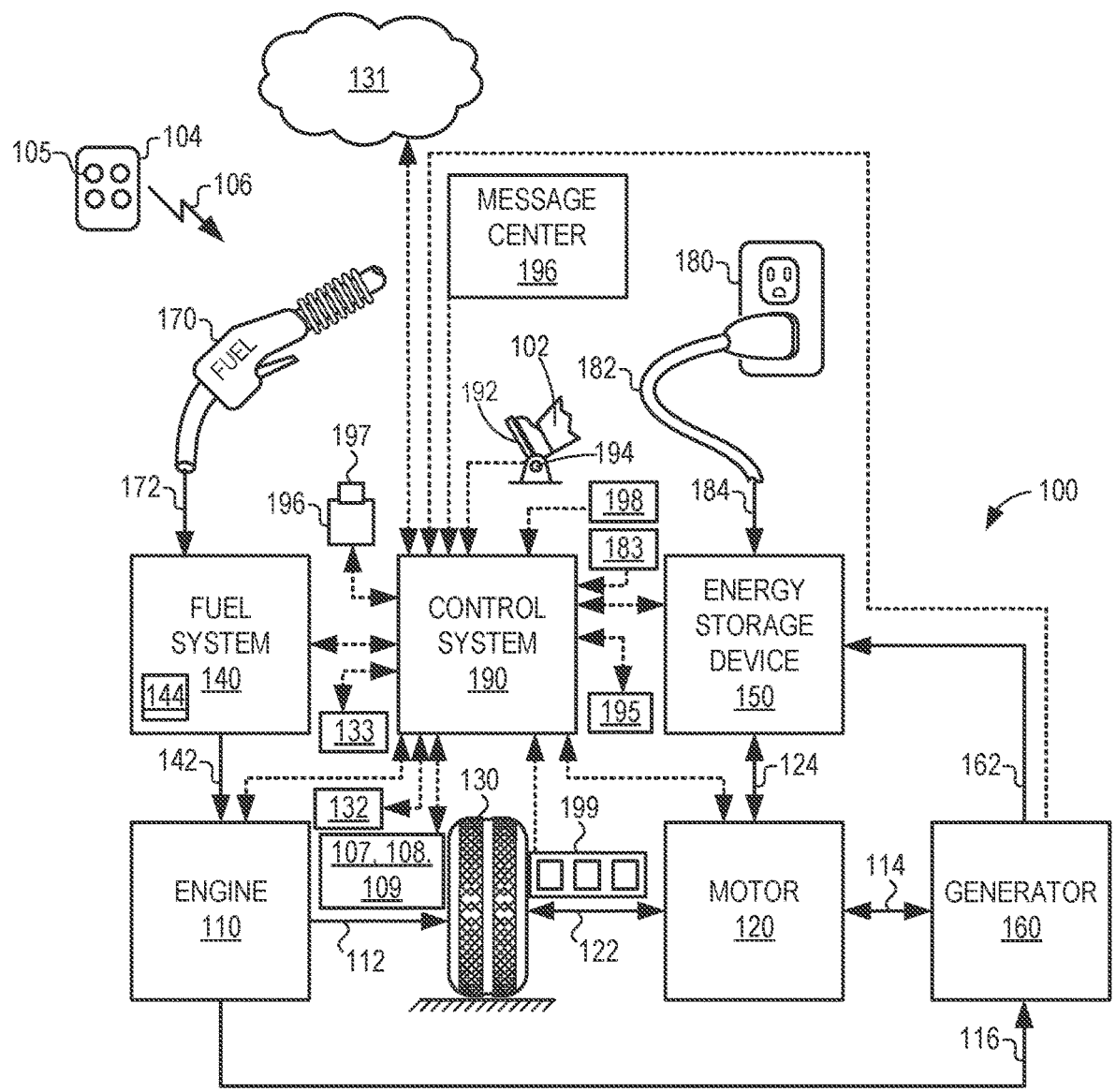
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162. In some examples, the motor 120 and generator 160 may comprise a same motor/generator.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in detail below, motor 120 may in some examples be utilized to spin or rotate the engine 110 in an unfueled configuration. More specifically, motor 120 may rotate the engine unfueled, using power from onboard energy storage device 150, which may include a battery, capacitor, super-capacitor, etc., for example. In a case where motor 120 is used to rotate the engine unfueled, fuel injection to engine cylinders may be prevented, and spark may not be provided to each of the engine cylinders. As will be discussed in further detail below, the engine may in some examples be spun or rotated unfueled, in a forward or default direction, whereas in other examples, the engine may be spun or rotated unfueled in a reverse direction. For example, an H-bridge circuit (see FIGS. 4A-4B) may be utilized to spin the engine in a forward or reverse direction. Still further, while not illustrated at FIG. 1 (but see FIG. 3), the vehicle propulsion system may in some examples include an electric booster, or electric compressor, which may similarly be controlled via the motor to rotate in either a forward or reverse orientation.

In some examples, engine 110 may be configured with a start/stop (S/S) feature 183 (also referred to herein as a S/S system) communicatively coupled to control system 190, wherein the control system 190 may automatically shut down (idle-stop) the internal combustion engine 110 without receiving operating input to shut down the engine, if selected idle-stop conditions, or in other words a set of predetermined conditions, are met. These may include, for example, torque demand being less than a threshold engine speed, vehicle speed below a threshold vehicle speed (e.g. 5 mph), the onboard energy storage device being sufficiently charged, no request being received for air-conditioning, etc. Likewise, the engine may be automatically restarted responsive to the torque demand being higher than the threshold, the battery (e.g. onboard energy storage device) requesting to be charged, an air-conditioning compressor requesting to be operated, etc. In one example, the engine may be restarted responsive to the operator applying the accelerator pedal after being stopped for a duration (e.g. at a traffic signal). The engine may be cranked unfueled via a motor (e.g. 120) or electric machine coupled to a crankshaft of the engine, until a desired engine speed is reached, after which the motor or electric machine may be disabled and engine fueling may be resumed. Thereafter engine combustion may be able to support engine spinning. As a result of the automatic start/stops, fuel consumption and exhaust emissions can be reduced.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, the fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, traffic information, etc. In one example, information received from the GPS may be utilized in conjunction with route learning methodology, such that routes commonly traveled by a vehicle may be learned by the vehicle control system 190. In some examples, other sensors 133, such as lasers, radar, sonar, acoustic sensors, etc., may be additionally or alternatively utilized in conjunction with the onboard navigation system to conduct route learning of commonly traveled routes by the vehicle.

Vehicle system 100 may in some examples also include sensors dedicated to indicating the occupancy-state of the vehicle, for example seat load cells 107, door sensing technology 108, and onboard cameras 109.

Figure 2:
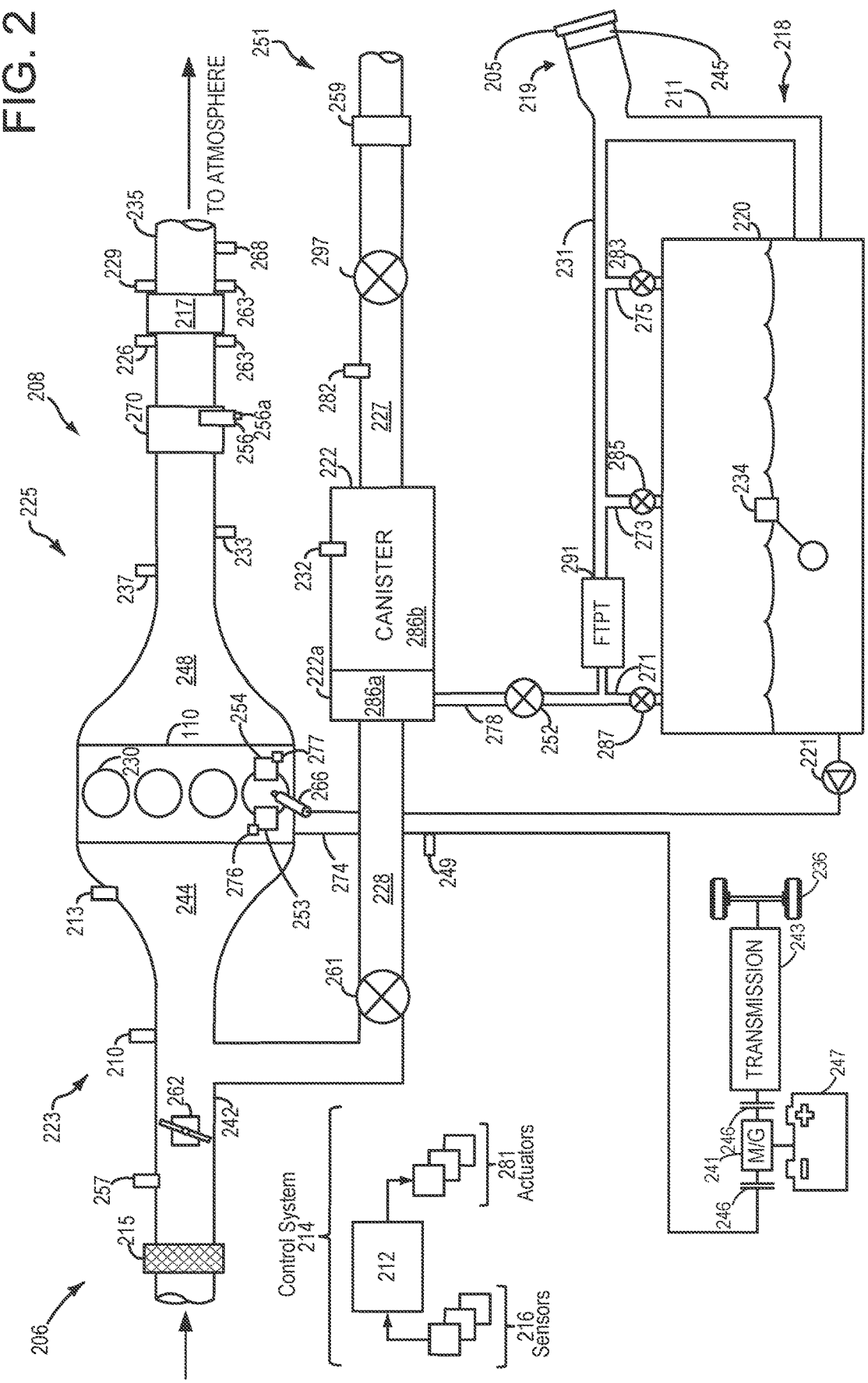
FIG. 2 schematically shows an example engine system with a fuel system and an evaporative emissions system.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system.

The engine system 208 may include an engine 110 having a plurality of cylinders 230. While not explicitly shown, it may be understood that each cylinder may include one or more intake valve(s) and one or more exhaust valve(s). The engine 110 includes an engine air intake 223 and an engine exhaust system 225. The engine air intake 223 includes a throttle 262 in fluidic communication with engine intake manifold 244 via an intake passage 242. The throttle 262 may comprise an electronic throttle, which may be controlled via the vehicle controller sending a signal to actuate the throttle to a desired position. In such an example where the throttle is electronic, power to control the throttle to the desired position may be from an onboard energy storage device (e.g. 150), such as a battery. Further, engine air intake 223 may include an air box and filter 215 positioned upstream of throttle 262. The engine exhaust system 225 includes an exhaust manifold 248 leading to an exhaust passage 235 that routes exhaust gas to the atmosphere. The engine exhaust system 225 may include one or more emission control devices, or exhaust catalyst 270, which may be mounted in a close-coupled position in the exhaust. The one or more emission control devices may include a three-way catalyst, lean NOx trap, diesel particulate filter, oxidation catalyst, etc. In some examples, the one or more emission control devices may include an electric heater 256, the electric heater 256 configured to raise a temperature of the emission control device to a desired operating temperature (e.g. light-off temperature). The electric heater may be under control of controller 212, which may send a signal to an electric heater actuator 256a, thus actuating the electric heater on, or off.

It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP. Alternatively, MAP may be inferred from alternate engine operating conditions, such as mass air flow (MAF), as measured by MAF sensor 210 coupled to the intake manifold.

Engine exhaust system 225 may further include a gasoline particulate filter (GPF) 217. GPF 217 may comprise a particulate filter, hydrocarbon trap, a catalyzed wash coat, or combination thereof. In some examples, during operation of engine 110, GPF 217 may be periodically regenerated by operating at least one cylinder of the engine within a particular air-fuel ratio to increase a temperature of GPF 217, such that retained hydrocarbons and soot particles may be oxidized. While a GPF is illustrated at FIG. 2, it may be understood that in other examples, a diesel particulate filter may instead be included in the vehicle propulsion system.

In some examples, temperature sensor 226 may be positioned upstream from the inlet of GPF 217 and temperature sensor 229 may be positioned downstream of GPF 217. Temperature sensors 226 and 229 may be used to assess the temperature of GPF 217 for regeneration purposes, for example. Furthermore, pressure in the exhaust system may be assessed by pressure sensor 263. Pressure sensor 263 may be a differential pressure sensor positioned upstream and downstream of GPF 217, for example. Pressure sensor 263 may be used to determine pressure at the inlet of GPF 217 in order to assess operating conditions for air to be introduced to the inlet of GPF 217 for regeneration. Furthermore, in some examples, soot sensor 268 may be positioned downstream of GPF 217, to assess the level of soot that is released from GPF 217. Soot sensor 268 may be used to diagnose operation of GPF 217, among other functions.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request (e.g., a vehicle operator initiated request), the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation, provided the fuel tank is coupled to the canister under such conditions). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261. As will be discussed in detail below, in some examples the FTIV may not be included, whereas in other examples, an FTIV may be included.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. As discussed, in some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, canister temperature sensor 232, MAF sensor 210, intake air temperature (IAT) sensor 257 and pressure sensor 263. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297, electric heater actuator 256a, etc. The controller may receive input data from the various sensors, process the input data, and trigger the actuators in response to the processed input data based on instruction or code programmed therein corresponding to one or more routines. Example control routines are described herein with regard to FIGS. 5-6.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode, or a remote start event may trigger a return to an awake mode. In some examples, a wakeup capability may enable a circuit to wake the controller in order to conduct diagnostics on the engine system, as will be discussed in further detail below.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced.

Intake manifold 244 is coupled to combustion chambers or cylinders 230 through a series of intake valves 253. The combustion chambers are further coupled to exhaust manifold 248 via a series of exhaust valves 254. While only one intake and one exhaust valve is depicted at FIG. 2, it may be understood that each combustion chamber or cylinder may include an intake and exhaust valve. In the depicted embodiment, a single exhaust manifold 248 is shown.

However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. While in this example illustration, a camshaft is not illustrated, one or more camshaft sensors (not shown) may be included in the vehicle propulsion system. Furthermore, crankshaft 274 may include crankshaft sensor 249. In some examples, one or both of crankshaft sensor 249 and/or camshaft sensors (not shown) may be utilized to infer a position of one or more pistons coupled to the engine cylinders 230.

In some examples, engine 110 may comprise a variable displacement engine (VDE) where each cylinder of engine 110 may be selectively deactivatable, where deactivatable refers to the ability of the controller 212 to command both intake and exhaust valves closed for particular cylinder(s), thus sealing the particular cylinders. If fuel injection is also stopped, then such action may result in the particular cylinder(s) being essentially an air-spring if the engine is rotating. Accordingly, as depicted herein, in one embodiment, deactivation of intake valve 253 may be controlled by first VDE actuator 276 while deactivation of exhaust valve 254 may be controlled by second VDE actuator 277. In alternate embodiments, a single VDE actuator may control deactivation of both intake and exhaust valves of a deactivatable cylinder. In still other embodiments, a single cylinder valve actuator may deactivates a plurality of cylinders (both intake and exhaust valves), for example all the cylinders in a deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators. It may be further understood that, while the engine 110 is depicted as a VDE engine, the engine may in other examples not be a VDE engine without departing from the scope of this disclosure.

In some examples, vehicle system 206 may be a hybrid vehicle with multiple sources of torque available to one or more vehicle wheels 236 (e.g. 130). In the example shown, vehicle system 206 includes engine 110 and an electric machine 241. Electric machine 241 may be a motor (e.g. 120) or a motor/generator. Crankshaft 274 of engine 110 and electric machine 241 are connected via a transmission 243 to vehicle wheels 236 when one or more clutches 246 are engaged. In the depicted example, a first clutch is provided between crankshaft 274 and electric machine 241, and a second clutch is provided between electric machine 241 and transmission 243. Controller 212 may send a signal to an actuator (not shown) of each clutch 246 to engage or disengage the clutch, so as to connect or disconnect crankshaft from electric machine 241 and the components connected thereto, and/or connect or disconnect electric machine 241 from transmission 243 and the components connected thereto. Transmission 243 may be a gearbox, a planetary gear system, or another type of transmission. The powertrain may be configured in various manners including as a parallel, a series, or a series-parallel hybrid vehicle.

Electric machine 241 receives electrical power from a traction battery 247 (e.g. 150) to provide torque to vehicle wheels 130. Electric machine 241 may also be operated as a generator to provide electrical power to charge traction battery 247, for example during a braking operation.

Figure 3:
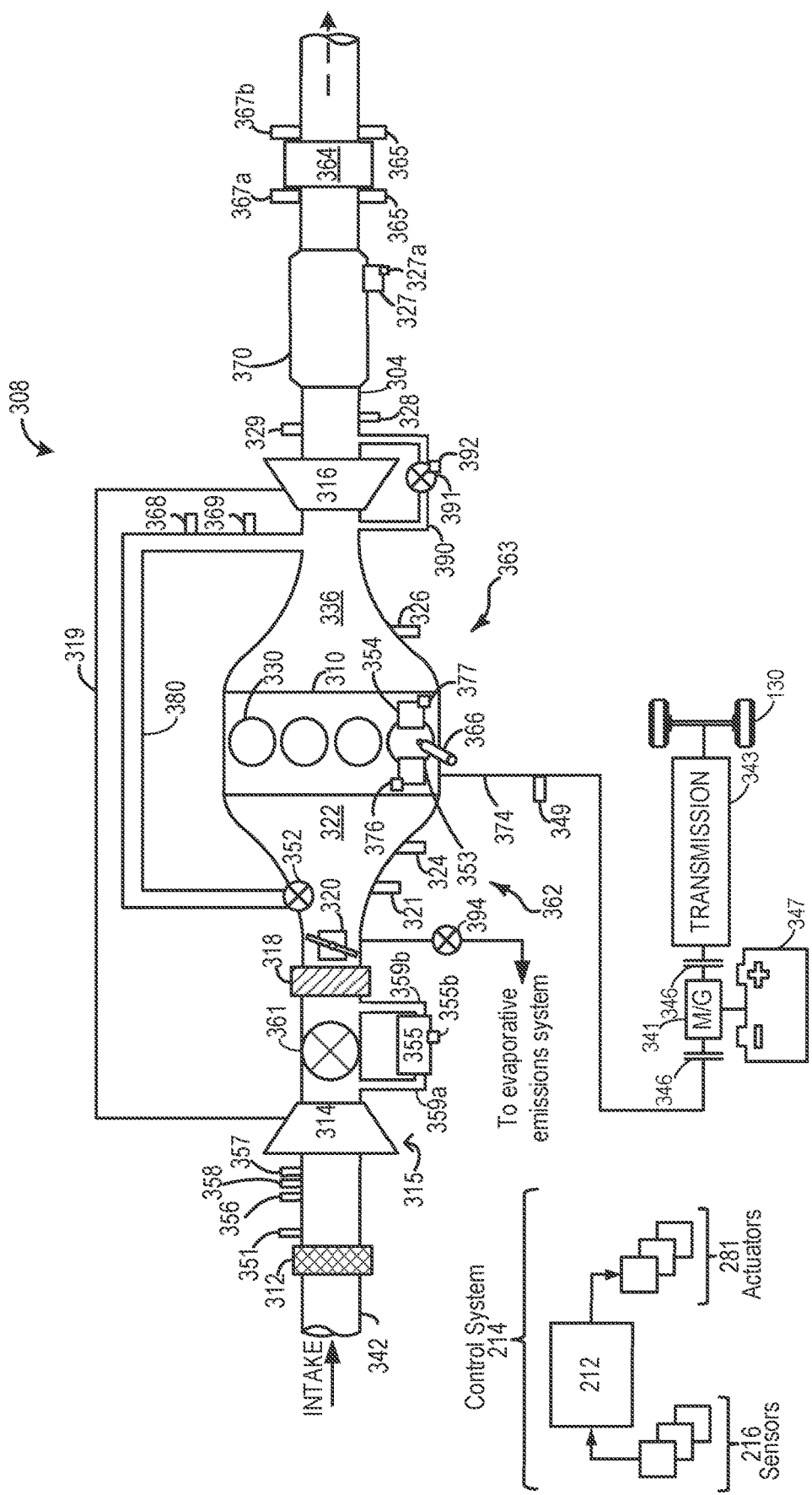
FIG. 3 schematically shows another example of an engine system including an electric booster.

Turning now to FIG. 3, it shows another example engine system 308. Engine system 308 may be included in vehicle propulsion system 206 (e.g. 100) without departing from the scope of this disclosure. It may be understood that many of the components of engine system 308 may also be included in engine system 206. The engine 310 (e.g. 110) includes an engine air intake system 362 (e.g. 223) and an engine exhaust system 363 (e.g. 225). In one example, the engine system 308 may be a diesel engine system. In another example, the engine system 308 may be a gasoline engine system. In the depicted embodiment, engine 310 is a boosted engine coupled to a turbocharger 315 including a compressor 314 driven by a turbine 316. Specifically, fresh air is introduced along intake passage 342 (e.g. 242) into engine 310 via air cleaner 312 (e.g. 215) and flows to compressor 314. The compressor may be any suitable intake-air compressor, such as a motor-driven or driveshaft driven supercharger compressor. In engine system 310, the compressor is a turbocharger compressor mechanically coupled to turbine 316 via a shaft 319, the turbine 316 driven by expanding engine exhaust.

As shown in FIG. 3, compressor 314 is coupled through charge-air cooler (CAC) 318 to throttle valve 320 (e.g. 262). Throttle valve 320 is coupled to engine intake manifold 322 (e.g. 244). From the compressor, the compressed air charge flows through the charge-air cooler 318 and the throttle valve 320 to the intake manifold 322. In the embodiment shown in FIG. 3, the pressure of the air charge within the intake manifold 322 is sensed by manifold air pressure (MAP) sensor 324 (e.g. 213). In some examples, air flow in the intake manifold may be sensed via a mass air flow (MAF) sensor 321 (e.g. 210). Temperature of ambient air entering the intake passage 342 may be estimated via an intake air temperature (IAT) sensor 351 (e.g. 257).

One or more sensors may be coupled to an inlet of compressor 314. For example, a temperature sensor 358 may be coupled to the inlet for estimating a compressor inlet temperature, and a pressure sensor 356 may be coupled to the inlet for estimating a compressor inlet pressure. As another example, an ambient humidity sensor 357 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 392 may be actuated to open wastegate 391 to dump at least some exhaust pressure from upstream of the turbine to a location downstream of the turbine via wastegate 391. By reducing exhaust pressure upstream of the turbine, turbine speed can be reduced, which in turn helps to reduce compressor surge. Wastegate 391 may be positioned in a wastegate passage 390. The methodology discussed herein utilizes a wastegate that is actuatable open and closed, however, it is herein recognized that in some examples, a spring-loaded wastegate may be included in the vehicle system.

To assist the turbocharger 315, an additional electric intake air compressor, herein also referred to as an electric compressor or electric booster 355 may be incorporated into the vehicle propulsion system. Electric booster 355 may be powered via an onboard energy storage device (e.g. 150), which may comprise a battery, capacitor, supercapacitor, etc. The electric booster may include a compressor driven by an electric motor. A speed of operation of the electric booster may include adjusting a speed of operation of the electric motor, the electric motor operated via the on-board energy storage device (e.g. 150).

In one example, electric booster 355 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric booster was not available. In such an example, responsive to the turbocharger spooling up to a threshold speed (e.g. 70,000 rpm), the electric booster 355 may be actuated off, or deactivated. More specifically, operational control of the electric booster 355 may be achieved based on command signals (e.g. duty cycle or pulse width signals) received from the vehicle controller (e.g. controller 212). For example, the controller may send a signal to an electric booster actuator 355b, which may actuate on the electric booster. In another example, the controller may send a signal to the electric booster actuator 355b, which may actuate off the electric booster. In one example the electric booster actuator may comprise an electric motor which drives the compression of air. In some examples, as will be discussed in detail below, the electric compressor may be rotated in a reverse direction. Reversing operation of the electric booster 355 may be achieved at least in part via an H-bridge circuit (see FIGS. 4A-4B).

Electric booster 355 may be positioned between a first electric booster conduit 359a, and a second electric booster conduit 359b. First electric booster conduit 359a may fluidically couple intake passage 342 to electric booster 355 upstream of electric booster bypass valve 361. Second electric booster conduit 159b may fluidically couple electric booster 155 to intake passage 342 downstream of electric booster bypass valve 361. As an example, air may be drawn into electric booster 355 via first electric booster conduit 359a upstream of electric booster bypass valve 361, and compressed air may exit electric booster 355 and be routed via second electric booster conduit to intake passage 342 downstream of electric booster bypass valve 361. In this way, compressed air may be routed to engine intake manifold 322. It may be understood that the above description relates to when the electric compressor is rotated in a forward direction. The electric compressor may in some examples be rotated in a reverse direction, which may thus result in compressed air being routed in the opposite direction, in other words, from the intake manifold (and in some examples the exhaust system) to atmosphere via intake passage 342.

In circumstances where the electric booster 355 is activated to provide boost more rapidly than if the turbocharger 315 were solely relied upon, it may be understood that electric booster bypass valve 361 may be commanded closed while electric booster 355 is activated. In this way, intake air may flow through turbocharger 315 and through electric booster 355. Once the turbocharger reaches the threshold speed, the electric booster 355 may be turned off, and the electric booster bypass valve 361 may be commanded open.

Intake manifold 322 is coupled to a series of combustion chambers 330 (e.g. 230) through a series of intake valves 353 (e.g. 253). The combustion chambers are further coupled to exhaust manifold 336 (e.g. 248) via a series of exhaust valves 354 (e.g. 254). In the depicted embodiment, a single exhaust manifold 336 is shown. However, in other embodiments, the exhaust manifold may include a plurality of exhaust manifold sections. Configurations having a plurality of exhaust manifold sections may enable effluent from different combustion chambers to be directed to different locations in the engine system.

As discussed above, in one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. While in this example illustration, a camshaft is not illustrated, one or more camshaft sensors (not shown) may be included in the vehicle propulsion system. Furthermore, it may be understood that vehicle system 308 may include a crankshaft 374 (e.g. 274) and may include a crankshaft sensor (e.g. 349). In some examples, one or both of the crankshaft sensor and/or camshaft sensors may be utilized to infer a position of one or more pistons coupled to the engine cylinders 330 (e.g. 230).

In some examples, engine 310 may comprise a variable displacement engine (VDE) where each cylinder of engine 310 may be selectively deactivatable, where deactivatable refers to the ability of the controller 212 to command both intake and exhaust valves closed for particular cylinder(s), thus sealing the particular cylinders. If fuel injection is also stopped, then such action may result in the particular cylinder(s) being essentially an air-spring if the engine is rotating. Accordingly, as depicted herein, in one embodiment, deactivation of intake valve 353 may be controlled by first VDE actuator 376 (e.g. 276) while deactivation of exhaust valve 354 may be controlled by second VDE actuator 377. In alternate embodiments, a single VDE actuator may control deactivation of both intake and exhaust valves of a deactivatable cylinder. In still other embodiments, a single cylinder valve actuator may deactivate a plurality of cylinders (both intake and exhaust valves), for example all the cylinders in a deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators.

Combustion chambers 330 may be supplied with one or more fuels, such as gasoline, alcohol fuel blends, diesel, biodiesel, compressed natural gas, etc., via injector 366 (e.g. 266). Fuel may be supplied to the combustion chambers via direct injection, port injection, throttle valve-body injection, or any combination thereof. In the combustion chambers, combustion may be initiated via spark ignition and/or compression ignition.

As shown in FIG. 3, exhaust from the one or more exhaust manifold sections may be directed to turbine 316 to drive the turbine. The combined flow from the turbine and the wastegate then flows through emission control device 370 (e.g. 270). In one example, the emission control device 370 may be a light-off catalyst. In general, the exhaust after-treatment device 370 is configured to catalytically treat the exhaust flow, and thereby reduce an amount of one or more substances in the exhaust flow. For example, the exhaust after-treatment device 370 may be configured to trap $NO_x$ from the exhaust flow when the exhaust flow is lean, and to reduce the trapped $NO_x$ when the exhaust flow is rich. In other examples, the exhaust after-treatment device 370 may be configured to disproportionate $NO_x$ or to selectively reduce $NO_x$ with the aid of a reducing agent. In still other examples, the exhaust after-treatment device 370 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. In some examples, the one or more emission control devices may include an electric heater 327 (e.g. 256), the electric heater 327 configured to raise a temperature of the emission control device to a desired operating temperature (e.g. light-off temperature). The electric heater may be under control of controller 212, which may send a signal to an electric heater actuator 327a, thus actuating the electric heater on, or off.

Engine exhaust system 363 may further include a gasoline particulate filter (GPF) 364 (e.g. 217). GPF 364 may comprise a particulate filter, hydrocarbon trap, a catalyzed wash coat, or combination thereof. In some examples, during operation of engine 310, GPF 364 may be periodically regenerated by operating at least one cylinder of the engine within a particular air-fuel ratio to increase a temperature of GPF 364, such that retained hydrocarbons and soot particles may be oxidized.

In some examples, temperature sensor 367*a* (e.g. 226) may be positioned upstream from the inlet of GPF 364 and temperature sensor 367*b* (e.g. 229) may be positioned downstream of GPF 364. Temperature sensors 367*a* and 367*b* may be used to assess the temperature of GPF 364 for regeneration purposes, for example. Furthermore, pressure in the exhaust system may be assessed by pressure sensor 365 (e.g. 263). Pressure sensor 365 may be a differential pressure sensor positioned upstream (closer to exhaust manifold) and downstream (farther from exhaust manifold) of GPF 364, for example. Pressure sensor 365 may be used to determine pressure at the inlet of GPF 364 in order to assess operating conditions for air to be introduced to the inlet of GPF 364 for regeneration. Furthermore, in some examples, a soot sensor may be positioned downstream of GPF 364, to assess the level of soot that is released from GPF 364.

Exhaust gas recirculation (EGR) delivery passage 380 may be coupled to the exhaust passage 304 (e.g. 235) upstream of turbine 316 to provide high pressure EGR (HP-EGR) to the engine intake manifold, downstream of compressor 314. An EGR valve 352 may be coupled to the EGR passage 380 at the junction of the EGR passage 380 and the intake passage 342. EGR valve 352 may be opened to admit a controlled amount of exhaust to the compressor outlet for desirable combustion and emissions control performance. EGR valve 352 may be configured as a continuously variable valve or as an on/off valve. In further embodiments, the engine system may additionally or alternatively include a low pressure EGR (LP-EGR) flow path wherein exhaust gas is drawn from downstream of turbine 316 and recirculated to the engine intake manifold, upstream of compressor 314.

One or more sensors may be coupled to EGR passage 380 for providing details regarding the composition and condition of the EGR. For example, a temperature sensor 368 may be provided for determining a temperature of the EGR, a pressure sensor 369 may be provided for determining a pressure of the EGR, a humidity sensor (not shown) may be provided for determining a humidity or water content of the EGR, and an air-fuel ratio sensor (not shown) may be provided for estimating an air-fuel ratio of the EGR. Alternatively, EGR conditions may be inferred by the one or more temperature, pressure, humidity, and air-fuel ratio sensors coupled to the compressor inlet.

A plurality of sensors, including an exhaust temperature sensor 328 (e.g. 233), an exhaust gas sensor 326 (e.g. 237), and an exhaust pressure sensor 329 may be coupled to the main exhaust passage 304. The exhaust gas sensor may be linear oxygen sensors or UEGO (universal or wide-range exhaust gas oxygen), two-state oxygen sensors or EGO, HEGO (heated EGO), a NOx, HC, or CO sensors.

Engine system 308 may further include control system 214, as discussed above. Control system 214 is shown receiving information from a plurality of sensors 216 (various examples of which are described herein) and sending control signals to a plurality of actuators 218 (various examples of which are described herein). As one example, sensors 216 may include exhaust gas sensor 326 located upstream of the turbine 316, MAP sensor 324, exhaust temperature sensor 328, exhaust pressure sensor 329, compressor inlet temperature sensor 358, compressor inlet pressure sensor 356, ambient humidity sensor 357, IAT sensor 351, engine coolant temperature sensor, etc. Other sensors such as additional pressure, temperature, air/fuel ratio, and composition sensors may be coupled to various locations in engine system 308.

The actuators 281 may include, for example, electric booster bypass valve 361, throttle 320, electric booster actuator 355*b*, EGR valve 352, wastegate actuator 392, and fuel injector 366. The control system 214 may include a controller 212. The controller 212 may receive input data from the various sensors, process the input data, and trigger various actuators in response to the processed input data based on instruction or code programmed therein corresponding to one or more routines.

Furthermore, similar to engine system 208, engine system 308 may be a hybrid vehicle with multiple sources of torque available to one or more vehicle wheels 130. For example, vehicle system 308 may include electric machine 341, also referred to as a motor or motor/generator. Crankshaft 374 (e.g. 274) may couple the engine 310 and the electric machine to wheels 331 (e.g. 130) via transmission 343 (e.g. 243) when one or more clutches 346 (e.g. 246) are engaged. Electric machine 341 (e.g. 241 or 120) may receive electrical power from traction battery 347 (e.g. 247 or 150), as discussed above. Crankshaft 374 may include a crankshaft sensor 349 (e.g. 249).

Still further, engine system 308 may be coupled to an evaporative emissions system (not shown at FIG. 3 but see 251 of FIG. 2) via a canister purge valve (CPV) 394 (e.g. 261). While the details of the evaporative emissions system and fuel system are not illustrated at FIG. 3, it may be understood that components of such systems are the same as that depicted above at FIG. 2.

Figure 4A:
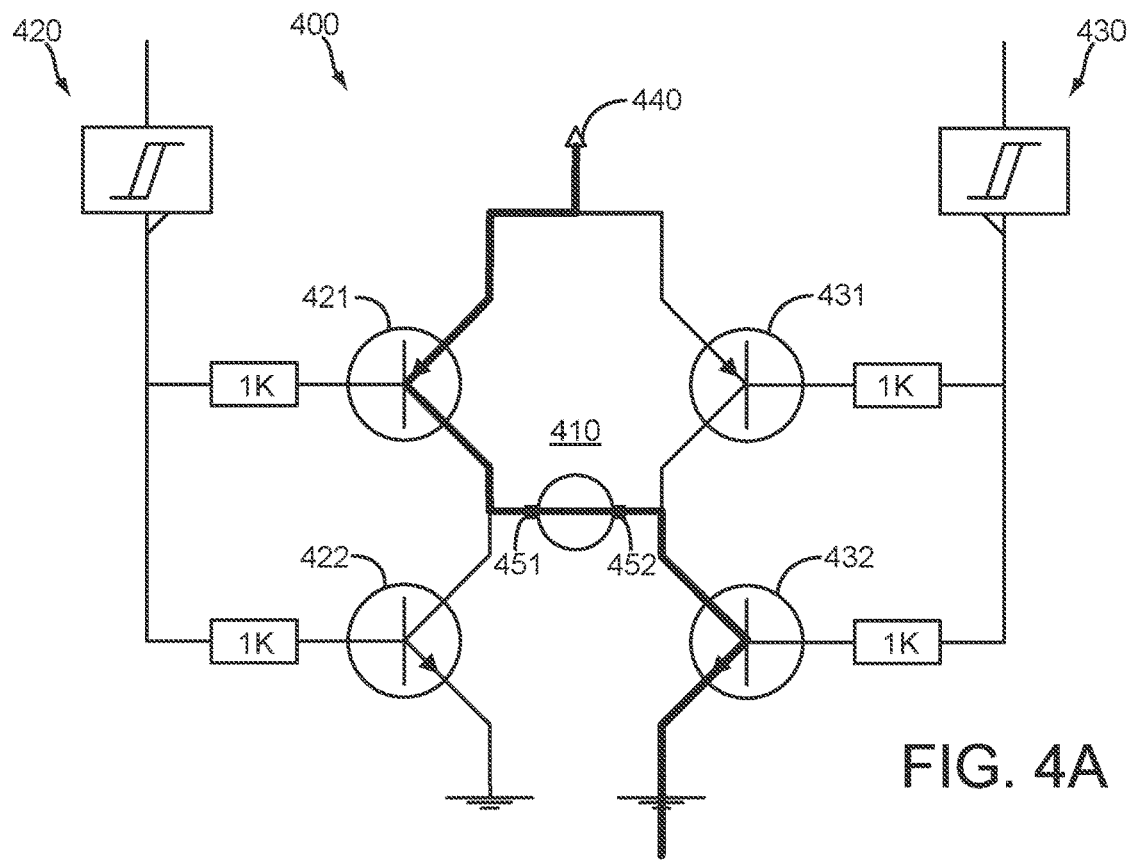
FIGS. 4A-4B depict example H-bridge circuitry which may be used to rotate a vehicle engine, or an electric compressor, in a forward or reverse direction.
Figure 4B:
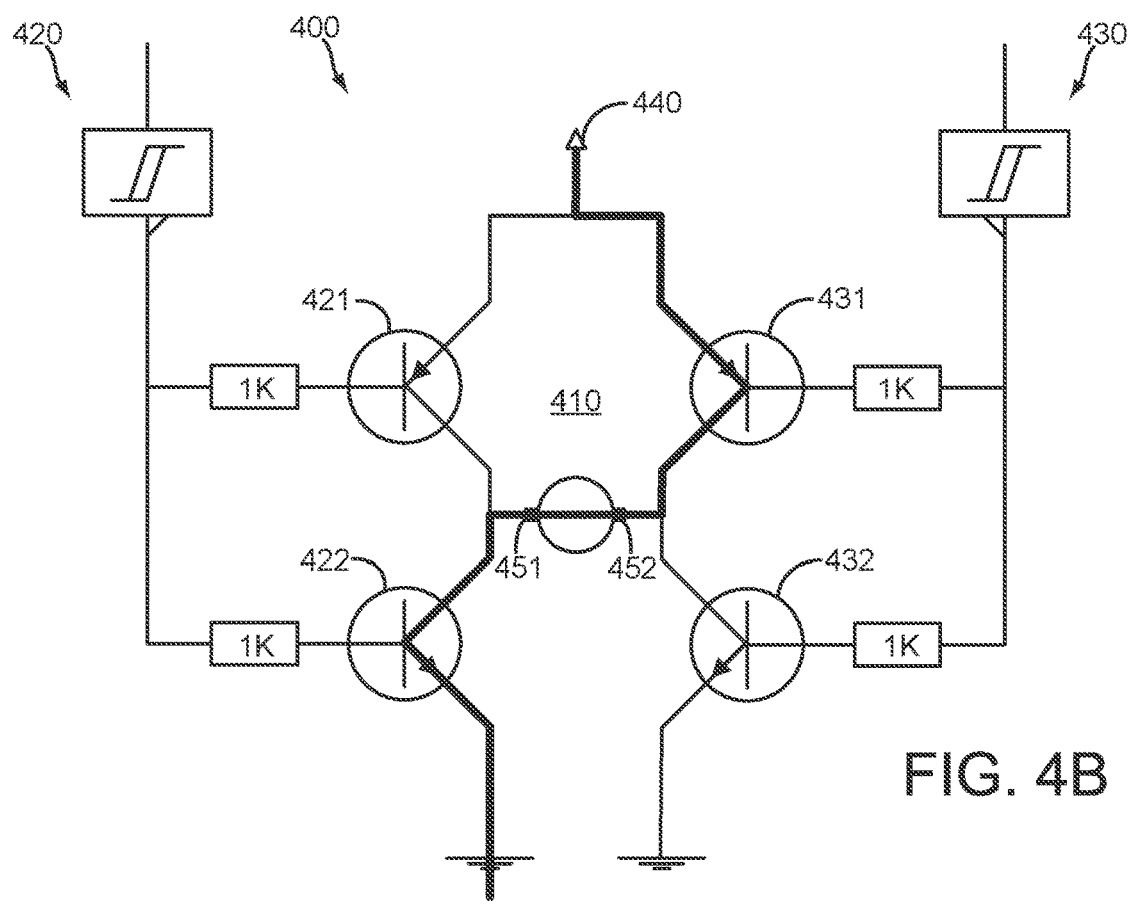

FIGS. 4A and 4B show an example circuit 400 that may be used for reversing a spin orientation of an electric motor (e.g. 120). Such a circuit may be used to spin the engine (e.g. 110) in a forward (e.g. the same direction as when the engine is operating to combust air and fuel) or reverse direction, and/or may be used to spin an electric compressor (e.g. 355) in a forward (e.g. where compressed air is routed to the engine and exhaust system) or reverse direction. Accordingly, circuit 400 schematically depicts an H-Bridge circuit that may be used to run a motor 410 (e.g. 120 and/or 241, 341)) in a first (forward) direction and alternately in a second (reverse) direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are activated (energized), while transistors 422 and 431 are off. In this configuration, the left lead 451 of motor 410 is connected to power source 440, and the right lead 452 of motor 410 is connected to ground. In this way, motor 400 may run in a forward (or default) direction. When operating the engine in a forward direction via the motor, the engine may be in a cranking mode for initial combustion commencement.

Additionally and/or alternatively, when operating the engine in a forward direction via the motor, the engine (and motor or another motor) may be in a drive mode to drive the vehicle. It may be understood that in some examples, the engine may be spun in the forward (e.g. default) direction under conditions where the vehicle is stationary and it is desired only for the engine to be spun or rotated in the forward direction, without combustion.

In FIG. 4B, transistors 422 and 431 are activated (energized), while transistors 421 and 432 are off. In this configuration, the right lead 452 of motor 410 is connected to power source 440, and the left lead 451 of motor 410 is connected to ground. In this way, motor 410 may run in a reverse direction.

The systems described above with regard to FIGS. 1-4B may thus enable a system for a hybrid vehicle comprising an engine including an intake and an exhaust system, a particulate filter positioned in the exhaust system, the particulate filter including a differential pressure sensor configured to indicate a loading state of the particulate filter, and an electric motor capable of rotating the engine unfueled. Such a system may further include a mass air flow sensor positioned in the intake of the engine, and a throttle positioned in the intake of the engine. Such a system may further include a controller with computer readable instructions stored in non-transitory memory that, when executed, cause the controller to, in response to an indication or determination that the loading state of the particulate filter is below a predetermined threshold loading state, route a first air-flow from the exhaust system to the intake of the engine and record a baseline intake air flow via the mass air flow sensor. The controller may store additional instructions to, at a later time, under conditions where the differential pressure sensor is indicated to be degraded and where the loading state of the particulate filter is independent of the differential pressure sensor reading, route a second air flow from the exhaust system to the intake of the engine and record a test intake air flow via the mass air flow sensor. Routing the first air flow and the second air flow may include commanding fully open the throttle. The controller may store additional instructions to conduct a regeneration procedure of the particulate filter in response to the baseline intake air flow differing by at least a threshold amount from the test intake air flow.

In such a system, the controller may store further instructions to route the first air-flow and route the second air-flow via rotating the engine unfueled via the motor.

In such a system, the system may further comprise an electric booster positioned in the intake of the engine upstream of the throttle, an exhaust gas recirculation valve positioned in an exhaust gas recirculation passage coupling the exhaust system to the intake of the engine, and a wastegate positioned in a wastegate passage in the exhaust system. The wastegate passage may be configured to route fluid flow around a turbine positioned in the exhaust system. Such a system may further comprise an electric booster bypass valve positioned in the intake of the engine upstream of the throttle, and variable displacement engine actuators for sealing cylinders of the engine. In such a system, the controller may store further instructions to route the first air-flow and route the second air-flow via operating the electric booster in reverse with the exhaust gas recirculation valve commanded open, the wastegate commanded open, the electric booster bypass valve commanded closed, and the cylinders of the engine sealed.

In such a system, the system may further comprise one or more seat load cells, door sensing technology, and/or onboard cameras. In such a system, the controller may store further instructions to route the first air-flow and route the second air-flow under conditions where the hybrid vehicle is indicated to be unoccupied, where occupancy state is indicated via one or more of the seat load cells, door sensing technology and/or onboard cameras.

Turning now to FIG. 5, a high-level flowchart for an example method 500 for obtaining baseline intake air flow measurements for use in determining whether to regenerate a GPF, is shown. More specifically, method 500 may be used under conditions where it is known that the GPF is substantially clean (e.g. below a threshold soot loading level, which may include 10% or less, 5% or less, etc.), in order to obtain baseline intake air flow measurements that are a function a level of restriction of an intake air filter positioned upstream of an intake air throttle. For example it may be determined via the controller, whether the GPF is substantially clean based on pressure across the GPF, as monitored, for example, via the differential pressure sensor (e.g. 263, 365). The baseline intake air flow measurements may be obtained via rotating the engine unfueled in reverse, and recording the intake air flow measurements via a MAF sensor (e.g. 210, 321).

Method 500 will be described with reference to the systems described herein and shown in FIGS. 1-4B, though it will be appreciated that similar methods may be applied to other systems without departing from the scope of this disclosure. Instructions for carrying out method 500 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-4B. The controller may employ actuators such as motor/generator (e.g. 241 or 341), throttle (e.g. 262 or 320), fuel injector(s) (e.g. 266 or 366), electric booster (e.g. 355), EGR valve (e.g. 352), wastegate actuator (e.g. 392), electric booster bypass valve (e.g. 361), etc., according to the methods described herein.

Method 500 begins at 505 and may include evaluating operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 510, method 500 may include indicating whether conditions are met for obtaining baseline intake air flow measurements that are a function of a level of restriction of an intake air filter (e.g. 215). Conditions being met at 510 may include an indication or determination via the controller that the GPF has been regenerated within a threshold duration of time prior to conducting method 500. The threshold duration may comprise 24 hours or less, 12 hours or less, 8 hours or less, 6 hours or less, 4 hours or less, etc. In other words, responsive to a determination of GPF regeneration being completed via onboard strategy (e.g. under control of the vehicle controller), a diagnostic to obtain the baseline intake air flow measurements may be scheduled, such that when conditions are determined to be met for obtaining the baseline intake air flow measurements, such action may commence.

At 510, conditions being met may further include an indication or determination via the controller of a remote start event where the vehicle is indicated to be unoccupied. Such a determination may be made via, for example, seat load cells (e.g. 107), door sensing technology (e.g. 108), onboard camera(s) (e.g. 109). In another example, conditions being met may include an indication or determination via the controller that the vehicle is an autonomously operated vehicle, where the vehicle is similarly indicated/determined to be unoccupied. In yet another example, conditions being met may include a scheduled wake-up of the vehicle controller at a time after a vehicle key-off event, where the vehicle is further indicated/determined to be unoccupied.

At 510, conditions being met may further include an indication or determination via the controller that the MAF sensor (e.g. 210, 321) positioned in engine intake is functioning as desired or expected.

If, at 510, conditions are not indicated/determined to be met for obtaining the baseline intake air flow measurements, method 500 may proceed to 515. At 515, method 500 may include maintaining current vehicle operating parameters. For example, if the vehicle is in operation then such vehicle operation may be maintained. If the vehicle is not in operation, then such a vehicle operational status may be maintained. It may be understood that vehicle operating parameters may be maintained until conditions are indicated/determined to be met for obtaining the baseline intake air flow measurements.

Returning to 510, responsive to conditions being determined to be met for obtaining the baseline intake air flow measurements, method 500 may proceed to 520. At 520, method 500 may include routing air flow from the exhaust system to engine intake. In one example, routing air flow from the exhaust system to engine intake may include rotating the engine in reverse, unfueled. More specifically, a motor (e.g. 241) may be actuated via the controller (e.g. 212) to rotate the engine (e.g. 110), in reverse. To rotate the engine in reverse via the motor, an H-bridge circuit may be utilized, as discussed above. The engine may be rotated in reverse at a predetermined speed (e.g. predetermined RPM).

While not explicitly illustrated, routing air flow from the exhaust system to engine intake via rotating the engine unfueled in reverse may include commanding fully open an intake throttle (e.g. 262, 320). In examples where an electric booster bypass valve (e.g. 361) is included in the engine system, the electric booster bypass valve may additionally be commanded open. For vehicles equipped with an EGR passage (e.g. 380), under conditions where routing air flow from the exhaust system to engine intake includes rotating the engine unfueled in reverse, the EGR valve (e.g. 352) may be commanded or maintained closed. Furthermore, in such a situation, a wastegate (e.g. 391) may be commanded open, to route air flow around the turbine (e.g. 316). However, in other examples, the wastegate may not be commanded open with reverse unfueled engine operation, without departing from the scope of this disclosure. In still other examples, a wastegate may not be included in the vehicle system (see for example FIG. 2).

In another example, rather than rotating the engine unfueled in reverse to route air flow from the exhaust system to engine intake, the electric booster (e.g. 355) may be utilized to draw air flow from the exhaust system to engine intake. To draw air flow from the exhaust system to engine intake, the electric booster may be operated in reverse, similar to the engine being operated in reverse. In such a situation, the electric booster bypass valve (e.g. 361) may be commanded or maintained closed, the throttle (e.g. 320) may be actuated fully open, engine cylinders may be actuated sealed, the EGR valve may be actuated open, and the wastegate valve may be actuated open. Sealing engine cylinders may include actuating intake and exhaust valves closed, for example via the controller sending a signal to VDE actuators (e.g. 376, 377) to actuate intake and exhaust valves for engine cylinders to a closed configuration. In this way, the electric booster may draw air from the exhaust system to engine intake, bypassing the engine and the turbine via the open EGR valve and open wastegate valve.

In examples where an electric booster is not included in the vehicle system, it may be understood that routing air flow from the exhaust system to engine intake is via rotating the engine unfueled in reverse. However, under conditions where the vehicle system includes an electric booster, it may be more energy efficient to rotate the electric booster in reverse to obtain the baseline air flow, where the turbine and engine may be bypassed as discussed. Accordingly, the vehicle controller may determine, based on battery charge, fuel level in fuel tank, learned driving routines, etc., whether to rotate the engine in reverse or to utilize the electric booster to route air flow from the exhaust system to engine intake, under conditions where an electric booster is included in the vehicle system.

Whatever method is selected via the controller to route air from the exhaust system to engine intake, method 500 may proceed to 525 responsive to the air flow being routed from the exhaust system to engine intake. At 525, method 500 may include obtaining mass air flow (MAF) readings for a predetermined duration while the engine is being rotated unfueled. MAF readings may be communicated to the controller, and may be obtained in periodic fashion, for example every 1-2 seconds, every 5 seconds, every 10 seconds, etc. It may be understood that MAF readings may be obtained via the MAF sensor (e.g. 321) positioned in engine intake. The predetermined duration may comprise a duration of time where MAF may be determined with high confidence.

Responsive to the predetermined duration elapsing, method 500 may proceed to 530. At 530, method 500 may include processing the MAF data obtained at step 525, and storing the processed MAF data at the controller. For example, processing the MAF data at 530 may include averaging all of the MAF data obtained at 525 in order to obtain a high confidence MAF determination.

With the MAF data processed and stored at the controller, method 500 may proceed to 535. At 535, method 500 may include stopping the routing air flow from the exhaust system to engine intake. For example, if the routing air flow included rotating the engine unfueled in reverse, then the engine may be stopped from rotating in reverse. Alternatively, in a situation where the electric booster was utilized to route air flow from the exhaust system to engine intake, the electric booster may be stopped from being activated in reverse. Furthermore, any valves that were actuated open/closed in order to conduct the routing may be returned to their initial state. For example, the electric booster bypass valve may be commanded closed and the throttle returned to the position it was in prior to the routing if the engine was rotated in reverse to route the air flow from the exhaust system to engine intake. Alternatively, if the electric booster was utilized to route the air flow from the exhaust system to engine intake, engine cylinders may be unsealed, the wastegate and EGR valve may be commanded closed, and the throttle may be returned to the position it was in prior to the routing.

With the baseline intake air flow measurements obtained and stored at the controller, method 500 may end.

It may be understood that the baseline intake air flow measurements compensate for a current state of the intake air filter. In other words, with the GPF being recently cleaned prior to obtaining the baseline intake air flow measurements, the variable to air flow in the intake of the engine becomes the state of the intake air filter. Thus, the baseline intake air flow measurements obtained via method 500 account for the current state of the intake air filter (e.g. more clogged or less clogged).

However, after obtaining the baseline intake air flow measurements, the state of the intake air filter may change. Accordingly, the baseline intake air flow measurements may be "aged", based on a model that is a function of engine run time and inferred or estimated dust ingestion into the intake via the intake air filter. In other words, the longer the engine operates prior to another baseline intake air flow measurement, the more loaded (e.g. with dust, insects, etc.) the intake air filter may become. Thus, the model may accurately predict a current loading state of the intake air filter at any time after the baseline intake air flow measurements have been obtained, which may be used to estimate or infer an expected MAF if the GPF were clean. This estimate may then be compared to an actual measurement of MAF (discussed below at FIG. 6), in order to indicate/determine an extent to which the GPF is loaded with soot. It may be understood that the current loading state of the intake air filter may be regularly (e.g. at predetermined time intervals) updated via the model in order to accurately reflect current intake air filter loading state.

Accordingly, turning now to FIG. 6, a high-level flowchart for an example method 600 for determining a loading state of the GPF under conditions where the GPF differential pressure sensor (e.g. 263, 365) is indicated to be degraded or otherwise not functioning as desired or expected, is shown. In such a situation, the loading state of the GPF may be independent of readings provided via the GPF differential pressure sensor. In other words, the loading state of the GPF may not be known under such conditions, or known to less than a threshold non-zero level of certainty. More specifically, in such a situation where the GPF differential pressure sensor is indicated to not be functioning as desired or expected, an alternative method depicted at FIG. 6 may be utilized to determine whether to regenerate the GPF, based on the indicated loading state of the GPF.

Method 600 will be described with reference to the systems described herein and shown in FIGS. 1-4B, though it will be appreciated that similar methods may be applied to other systems without departing from the scope of this disclosure. Instructions for carrying out method 600 and the rest of the methods included herein may be executed by a controller, such as controller 212 of FIG. 2, based on instructions stored in non-transitory memory, and in conjunction with signals received from sensors of the engine system, such as temperature sensors, pressure sensors, and other sensors described in FIGS. 1-4B. The controller may employ actuators such as motor/generator (e.g. 241 or 341), throttle (e.g. 262 or 320), fuel injector(s) (e.g. 266 or 366), electric booster (e.g. 355), EGR valve (e.g. 352), wastegate actuator (e.g. 392), electric booster bypass valve (e.g. 361), etc., according to the methods described herein.

Method 600 begins at 605 and may include evaluating operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 610, method 600 may include indicating or determining via the controller whether GPF differential pressure sensor degradation is indicated. For example, circuit codes or other sensor rationality codes may be communicated to/via the controller to indicate/determine that the GPF sensor is not functioning as desired or expected. In the absence of such an indication that the GPF sensor is degraded or otherwise not functioning as desired, method 600 may proceed to 615. At 615, method 600 may include maintaining current vehicle operating parameters. For example, if the vehicle is in operation, being propelled via the engine, electric motor, or some combination of the two, such operation may be maintained. In another example, if the engine is not in operation, such vehicle status may be maintained. Method 600 may then end.

Returning to 610, in response to an indication/determination that GPF differential pressure sensor degradation is indicated, method 600 may proceed to 620. At 620, method 600 may include indicating/determining whether conditions are met for determining a level of GPF restriction, or in other words, a loading state of the GPF (e.g. level of soot loading). More specifically, because the GPF differential pressure sensor is not functioning as desired, an alternative method may be utilized to determine whether it is desirable to regenerate the GPF.

Conditions being met at 620 may be similar to those of step 510 of method 500 for obtaining the baseline intake air flow measurements that are a function of a level of restriction of an intake air filter (e.g. 215). More specifically, conditions being met at 620 may include an indication that the baseline intake air flow measurements have previously been obtained according to method 500. Conditions being met at 620 may further include an indication/determination that the MAF sensor positioned in engine intake is functioning as desired. Conditions being met at 620 may further include an indication/determination that no engine system degradation has occurred that may impact the determination of GPF soot load since the baseline intake air flow measurements were obtained. More specifically, conditions being met at 620 may include an indication/determination that one or more of the throttle, wastegate, EGR valve, VDE actuators, electric booster bypass valve, etc., are functioning as desired or expected.

Conditions being met at 620 may further include an indication/determination of a remote start where it is indicated that the vehicle is unoccupied. In another example, conditions being met at 620 may include an indication/determination that the vehicle comprises an autonomously driven vehicle, where the vehicle is unoccupied. Conditions being met at 620 may additionally or alternatively include an indication/determination that the vehicle controller has been awoken from a sleep mode of operation, at a specified time since a key-off event, specifically to conduct the diagnostic for determining GPF restriction.

If, at 620, conditions are not yet indicated/determined to be met for determining the GPF restriction level, method 600 may proceed to 625. At 625, method 600 may include maintaining current vehicle operating parameters, and may further include scheduling the diagnostic via the controller for the next potential opportunity where conditions are met for conducting the diagnostic to determine the level of GPF restriction.

Responsive to conditions being indicated to be met for conducting the diagnostic, method 600 may proceed to 630. At 630, method 600 may include routing air flow from the exhaust system to engine intake.

Similar to step 520 of method 500, at 630 method 600 may include routing air flow from the exhaust system to engine intake via rotating the engine in reverse, unfueled. As discussed, a motor (e.g. 241) may be actuated via the controller (e.g. 212) to rotate the engine (e.g. 110), in reverse. To rotate the engine in reverse via the motor, an H-bridge circuit may be utilized, as discussed above. The engine may be rotated in reverse at a predetermined speed (e.g. predetermined RPM). The predetermined speed may comprise the same predetermined speed the engine is rotated in reverse unfueled to obtain the baseline intake air flow measurements as discussed above at FIG. 5.

As discussed above, routing air flow from the exhaust system to engine intake via rotating the engine unfueled in reverse may include commanding fully open an intake throttle (e.g. 262, 320). In examples where an electric booster bypass valve (e.g. 361) is included in the engine system, the electric booster bypass valve may additionally be commanded open under conditions where the engine is rotated unfueled in reverse to route air flow from the exhaust system to engine intake. For vehicles equipped with an EGR passage (e.g. 380), under conditions where routing air flow from the exhaust system to engine intake includes rotating the engine unfueled in reverse, the EGR valve (e.g. 352) may be commanded or maintained closed. Furthermore, in such a situation, a wastegate (e.g. 391) may be commanded open, to route air flow around the turbine (e.g. 316). However, in other examples, the wastegate may not be commanded open with reverse unfueled engine operation, without departing from the scope of this disclosure. In still other examples, a wastegate may not be included in the vehicle system (see for example FIG. 2).

In another example, rather than rotating the engine unfueled in reverse to route air flow from the exhaust system to engine intake, the electric booster (e.g. 355) may be utilized to draw air flow from the exhaust system to engine intake. To draw air flow from the exhaust system to engine intake, the electric booster may be operated in reverse, similar to the engine being operated in reverse (e.g. via use of an H-bridge). In such a situation, the electric booster bypass valve (e.g. 361) may be commanded or maintained closed, the throttle (e.g. 320) may be actuated fully open, engine cylinders may be actuated sealed, the EGR valve may be actuated open, and the wastegate valve may be actuated open. Sealing engine cylinders may include actuating intake and exhaust valves closed, for example via the controller sending a signal to VDE actuators (e.g. 376, 377) to actuate intake and exhaust valves for engine cylinders to a closed configuration. In this way, the electric booster may draw air from the exhaust system to engine intake, bypassing the engine and the turbine via the open EGR valve and open wastegate valve.

In examples where an electric booster is not included in the vehicle system, it may be understood that routing air flow from the exhaust system to engine intake is via rotating the engine unfueled in reverse. However, as discussed above, under conditions where the vehicle system includes an electric booster, it may be more energy efficient to rotate the electric booster in reverse to obtain the baseline air flow, where the turbine and engine may be bypassed as discussed. Accordingly, the vehicle controller may determine, based on battery charge, fuel level in fuel tank, learned driving routines, etc., whether to rotate the engine in reverse or to utilize the electric booster to route air flow from the exhaust system to engine intake, under conditions where an electric booster is included in the vehicle system.

It may be understood that if the baseline intake air flow measurements of method 500 were obtained via rotating the engine unfueled in reverse, then routing air flow from the exhaust system at 630 may include rotating the engine unfueled in reverse. In such a case, if the baseline measurements were obtained with the wastegate open, then the wastegate may be commanded open to route air flow from the exhaust system to engine intake at 630. Similarly, if the electric booster was utilized to obtain the baseline measurements, then the electric booster may similarly be used at 630 to route air flow from the exhaust system to engine intake at 630. Under such conditions, where the electric booster was used to obtain the baseline measurements, which may further include commanding fully open the throttle, wastegate, and EGR valve (along with sealing engine cylinders), then such action may additionally be conducted at 630 to route air flow from the exhaust system to engine intake.

In other words, it may be understood that the exact same methodology may be utilized to route air flow from the exhaust system to engine intake at step 520 of method 500 and at step 630 of method 600. More specifically, it may be understood that the diagnostic relying on baseline measurements (method 500) and test measurements (method 600) to determine a level of GPF soot loading may be robust if the same method is used for obtaining baseline and test measurements, but may be prone to error if different methodology is used for obtaining the baseline measurements as compared to obtaining test measurements.

Furthermore, it may be understood that if the electric booster is used to obtain the baseline measurements and test measurements, then a speed at which the electric booster is spun in reverse to obtain baseline measurements may be the same speed as that which the electric booster is spun in reverse for obtaining the test measurements. Similarly, if reverse unfueled engine rotation is used to obtain the baseline measurements and test measurements, then a speed at which the engine is rotated in reverse for obtaining the baseline measurements may be the same as the speed at which the engine is rotated in reverse for obtaining the test measurements.

Subsequent to commencing routing air flow from the exhaust system to engine intake at 630, method 600 may proceed to 635. At 635, method 600 may include obtaining/determining MAF sensor readings for a predetermined duration. It may be understood that the predetermined duration may comprise the same predetermined duration as that described at step 525 of method 500. MAF readings may be communicated to the controller, and may be obtained in periodic fashion, as discussed above.

Responsive to the predetermined duration elapsing, while not explicitly illustrated, it may be understood that the controller may process the MAF data in order to obtain an average MAF determination over the course of the routing of air flow from the exhaust system to engine intake. The averaged or otherwise processed MAF data may be stored at the controller.

Proceeding to 640, method 600 may include indicating/determining via the controller whether a difference between the baseline intake air flow data (obtained via method 500, and which may be aged as a function of engine run time, expected/inferred/estimated dust intake, etc.) is greater than a threshold difference from the test intake air flow data (obtained via method 600). The threshold difference may comprise a predetermined threshold, for example, and may be stored at the controller. It may be understood that the closer the baseline intake air flow data is to the test intake air flow data, the less restricted the GPF. Alternatively, the more different the baseline intake air flow data is from the test intake air flow data, the more restricted (e.g. more loaded, or more clogged) the GPF.

Thus, at 640, the controller may determine whether the baseline data is greater than the threshold difference from the test intake air flow data. If, at 640, the difference is greater than the threshold difference, method 600 may proceed to 645. At 645, method 600 may include stopping the routing of air flow from the exhaust system to engine intake. For example, as discussed above, if the routing air flow included rotating the engine unfueled in reverse, then the engine may be stopped from rotating in reverse. Alternatively, in a situation where the electric booster was utilized to route air flow from the exhaust system to engine intake, the electric booster may be stopped from being activated in reverse. Furthermore, any valves that were actuated open/closed in order to conduct the routing may be returned to their initial state. For example, the electric booster bypass valve may be commanded closed and the throttle returned to the position it was in prior to the routing if the engine was rotated in reverse to route the air flow from the exhaust system to engine intake. Alternatively, if the electric booster was utilized to route the air flow from the exhaust system to engine intake, engine cylinders may be unsealed, the wastegate and EGR valve may be commanded closed, and the throttle may be returned to the position it was in prior to the routing.

Proceeding to step 650, method 600 may include scheduling a GPF cleaning routine, and may include conducting the GPF cleaning routing responsive to conditions being met for doing so. In one example, conditions may be met for doing so just after it has been indicated via the controller as to whether the difference between the baseline air flow is greater than the threshold difference from the test air flow. For example, the cleaning routine may include activating the engine to combust air and fuel, and may further include controlling fueling and/or spark such that the engine runs lean. The lean engine operation may direct oxygen and hot exhaust air to the GPF for regeneration. In another example, cleaning may include routing oxygen to the exhaust system via a compressor (e.g. electric booster or turbocharger). In still another example, regeneration may be performed during deceleration fuel shut off (DFSO) conditions, where fuel is cut off from the engine and oxygen thus becomes available in the exhaust.

The regeneration procedure may comprise a predetermined duration whereby the engine is operated lean, in some examples. In another example, the amount of time the regeneration procedure is conducted may be a function of a level of restriction of the GPF. For example, the greater the difference between the baseline air flow as compared to the test air flow, the longer the amount of time the GPF may be regenerated.

In other examples, the GPF may be scheduled to be cleaned at the next possible instance when it is indicated that conditions are met for doing so. As the GPF is indicated to be restricted, and thus cleaning of the GPF is desired, it may be understood that the GPF cleaning routine may be scheduled as early as possible after the determination that the GPF is restricted and that cleaning is recommended.

Responsive to the cleaning routine being conducted at 650, method 600 may proceed to 655. At 655, method 600 may include verifying that the GPF was effectively cleaned. While not explicitly illustrated, it may be understood that verifying that the GPF was effectively cleaned may include again conducting steps 630-640 of method 600. If the GPF was effectively cleaned, the difference between the baseline air flow and test air flow may be substantially similar, for example within 5% of each other. If, for some reason it is indicated that the GPF was not effectively cleaned, then the cleaning routine may be again scheduled and conducted responsive to conditions being met for doing so, and then it may be verified as to whether the GPF was effectively cleaned once again. Such actions may be repeated any number of times until it is indicated that the GPF has been effectively cleaned.

Responsive to the GPF being indicated/determined to be effectively cleaned, method 600 may proceed to 660. At 660, method 600 may include updating vehicle operating conditions to reflect the recently cleaned GPF. For example, updating vehicle operating conditions at 660 may include scheduling a new baseline intake air flow routine (e.g. method 500) as soon as possible after the GPF cleaning routine. In other words, a baseline intake air flow routine may be scheduled to be conducted as soon as conditions are met for doing so, after the GPF cleaning routine has been conducted. Method 600 may then end.

Returning to 640, responsive to the difference between the baseline intake air flow data (method 500) being less than the threshold difference from the test intake air flow data (method 600), method 600 may proceed to 665. A 665, method 600 may include not yet scheduling the GPF cleaning routine. Proceeding to 670, method 600 may include stopping the routing of air flow from the exhaust system to engine intake, as discussed above with regard to step 645 of method 600. Proceeding to 675, method 600 may include updating vehicle operating conditions to reflect the information that the GPF filter was indicated to not be restricted to a point where cleaning of the filter is recommended. For example, updating vehicle operating conditions may include scheduling another test diagnostic for determining a level of GPF restriction, as a function of how different the baseline intake air flow data was indicated to be from the test intake air flow data. For example, the less loaded the GPF, the further out the test diagnostic may be scheduled. Alternatively, the more loaded the GPF, the sooner the test diagnostic may be scheduled. Method 600 may then end.

The methodology discussed with regard to FIGS. 5-6 may thus enable a method comprising regenerating a particulate filter positioned in an exhaust system of an engine of a vehicle in response to a first air-flow in an intake of the engine differing from a second air-flow in the intake of the engine by at least a threshold amount, the air flows including air-flow routed from the exhaust system to an engine intake through the engine. In such a method, the first air-flow may comprise a baseline intake air-flow obtained under conditions where the particulate filter is known to be loaded less than a threshold loading state (in other words, where the particulate filter is known to be substantially clean). The first air-flow may be a function of a loading state of an intake air filter, for example. The baseline air-flow in such a method may be aged according to a model of air inducted to the engine and/or dust or other particulate matter trapped by the intake air filter, over time.

In such a method, the second air-flow may comprise a test intake air-flow, and may be obtained under conditions where a differential pressure sensor coupled to the particulate filter is known to be degraded or otherwise not functioning as desired or expected. Furthermore, in one example, the first air-flow and the second air-flow may be obtained/determined via rotating the engine unfueled, in reverse. In another example the first air-flow and the second air flow may be obtained/determined via rotating an electric booster positioned in the engine intake in reverse. As one example, rotating the electric booster in reverse may further comprise routing the first air-flow and the second air-flow around the engine and a turbine positioned in the exhaust system.

Such a method may further comprise commanding fully open a throttle positioned in the engine intake just prior to obtaining the first air-flow and the second air-flow. In such a method, the particulate filter may comprise one of a gasoline particulate filter, or a diesel particulate filter. Furthermore, such a method may further comprise obtaining the first air-flow and the second air-flow under conditions where the vehicle is unoccupied and/or operating autonomously.

The methodology of FIGS. 5-6 may further enable another method comprising routing a first air-flow from an exhaust system of an engine to an intake of the engine to obtain a baseline intake air-flow under conditions where a particulate filter positioned in the exhaust system is loaded below a threshold loading state. Such a method may further comprise routing a second air-flow from the exhaust system of the engine to the intake of the engine to obtain a test intake air-flow under conditions independent of a loading state of the particulate filter. Such a method may further comprise conducting a regeneration procedure of the particulate filter in response to the baseline intake air-flow differing by at least a threshold amount from the test intake air-flow.

In such a method, routing the first air-flow and routing the second air-flow may further comprise rotating the engine in reverse, unfueled. In another example of such a method, routing the first air-flow and routing the second air-flow may further comprise operating an electric booster positioned in the intake of the engine in reverse, where operating the electric booster in reverse may further comprise routing the first air-flow and the second air-flow around the engine and around a turbine positioned in the exhaust system. Routing the first air-flow and the second air-flow around the engine and around the turbine may further comprise commanding cylinders of the engine sealed, commanding open an exhaust gas recirculation valve positioned in an exhaust gas recirculation passage, and commanding open a wastegate positioned in a wastegate passage, the wastegate passage positioned in the exhaust system and configured to bypass the turbine.

In such a method, the method may further comprise updating the baseline intake air-flow subsequent to obtaining the baseline intake air-flow and prior to obtaining the test intake air-flow, where updating the baseline intake air-flow may include modeling the baseline intake air-flow as a function of an amount of air and other particulate matter ingested into the engine via an intake air filter, over time.

Further, in such a method, obtaining the baseline intake air-flow and obtaining the test intake air-flow may include monitoring the first air-flow and the second air-flow via a mass air flow sensor positioned in the intake of the engine, where routing the first air-flow and the second air-flow may further comprise commanding fully open a throttle positioned in the intake of the engine. Turning now to FIG. 7, an example timeline 700 is shown, depicting the obtaining of baseline intake air flow measurements according to the method depicted at FIG. 5. More specifically, timeline 700 depicts obtaining the baseline intake air flow measurements via rotating the engine unfueled in reverse. Timeline 700 includes plot 705, indicating whether conditions are met for obtaining baseline data, and plot 710, indicating a status of the engine, over time. The engine may either be rotating in a forward direction (e.g. the same direction as when the engine is combusting air and fuel), rotating in a reverse direction, or may be stopped (e.g. not rotating). Timeline 700 further includes plot 715, indicating a status of fuel injection provided to the engine, over time. Fuel injection may be either on, or off. Timeline 700 further includes plot 720, indicating a position of the intake throttle, over time. The throttle may be open (e.g. fully open), closed (e.g. fully closed), or may be somewhere in between. Timeline 700 further includes plot 725, indicating an engine speed, over time. Engine speed may be 0 (e.g. not rotating), or may be increased (+) as compared to not rotating. Timeline 700 further includes plot 730, indicating data obtained via a MAF sensor positioned in engine intake, over time. For example, the MAF sensor may indicate no flow, or may indicate an air flow greater than (+) no flow. Timeline 700 further includes plot 735, indicating whether GPF differential pressure sensor degradation is indicated, over time. Timeline 700 further includes plot 740, indicating a status of the controller, over time. The controller may be either asleep, or awake.

At time t0, conditions are not indicated to be met for obtaining the baseline data. In this example timeline, it may be understood that the controller scheduled the diagnostic for obtaining baseline intake air flow measurements such that the controller is scheduled to wake up at a determined time frame after the controller has been put to sleep. As the controller is still asleep (plot 740), conditions are not yet indicated to be met for obtaining the baseline intake air flow data (plot 705). The engine is stopped (plot 710), fuel injection is off (plot 715), and the throttle is in a position that the throttle was in at the last key-off event (plot 720). As the engine is stopped, engine speed is 0 RPM (plot 725). Furthermore, with the engine off, no flow is indicated via the MAF sensor (plot 730). While it may be understood that with the controller asleep, the MAF sensor may not be monitoring air flow in the intake, but for illustrative purposes it is shown that there is no flow in the engine intake with the engine off. Still further, no GPF differential pressure sensor degradation is indicated (plot 735) as yet.

At time t1, the duration of time the controller was put to sleep for elapses, and thus the controller is awakened (plot 740), and conditions are indicated to be met for obtaining the baseline intake air flow. Accordingly, at time t2, the throttle is commanded fully open (plot 720), and the engine is rotated in reverse (plot 710) unfueled (plot 715). The engine is controlled to be rotated in reverse unfueled at a predetermined engine speed (e.g. predetermined engine RPM) (plot 725) between time t2 and t3. With the engine rotating in reverse unfueled, air flow is routed from the exhaust system to engine intake, via the engine. While not explicitly shown, in some examples a wastegate may be commanded/actuated open in order to route air around a turbine. However, in other examples, the wastegate may be maintained closed.

With air flow being routed from the exhaust system to engine intake, MAF (plot 730) is measured via a MAF sensor positioned in engine intake. MAF may be measured for a predetermined duration, as discussed above. At time t3, the predetermined duration elapses, and the MAF data is averaged to obtain an average MAF corresponding to baseline intake air flow. The average MAF data or baseline intake air flow is represented via dashed line 731. The baseline intake air flow may be stored at the controller, as discussed above.

With the baseline intake air flow obtained at time t3, the engine may be stopped from rotating (plot 710), and the throttle (plot 720) may be returned to the position it was in prior to being commanded fully open. With the engine commanded to be stopped from rotating, between time t3 and t4, engine speed returns to 0 RPM (plot 725), and MAF in the intake returns to no flow (plot 730).

At time t4, with the baseline intake air flow measurements obtained, conditions are no longer indicated to be met for obtaining the baseline data (plot 705), and accordingly, the controller is returned to sleep mode (plot 740). Between time t4 and t5, the controller is maintained asleep and the engine is maintained off.

Turning now to FIG. 8, another example timeline 800 is shown, depicting the obtaining of baseline intake air flow measurements, via the use of an electric booster positioned in engine intake upstream of an intake throttle. Timeline 800 includes plot 805, indicating whether conditions are met for obtaining baseline data, and plot 810, indicating engine status, over time. The engine may be either stopped from rotating, rotating in reverse, or rotating the in the forward direction. Timeline 800 further includes plot 815, indicating fuel injection status to the engine, over time. Fuel injection may be on, or off, over time. Timeline 800 further includes plot 820, indicating a position of an intake throttle, over time. Timeline 800 further includes plot 825, indicating engine speed, over time. Engine speed may be 0 RPM, or may be greater (+) than 0 RPM. Timeline 800 further includes plot 830, indicating MAF in engine intake, over time. There may be no flow in the intake, or there may be flow increased (+) above no flow. Timeline 800 further includes plot 835, indicating whether a GPF differential pressure sensor is indicated to be degraded, over time. Timeline 800 further includes plot 840, indicating whether the controller is asleep, or awake, over time. Timeline 800 further includes plot 845, indicating whether a wastegate is open, or closed, and plot 850, indicating whether an EGR valve is open, or closed, over time. Timeline 800 further includes plot 855, indicating a status (on or off) of an electric booster, over time. In this example timeline, it may be understood that when the electric booster is on, the electric booster is operating in reverse. Timeline 800 further includes plot 860, indicating whether engine cylinders are sealed, or unsealed, over time. It may be understood that "unsealed" in this context refers to engine cylinders that have not been actively sealed, such as via VDE actuators, whereas "sealed" in this context refers to engine cylinders for which intake and exhaust valves have been commanded or actuated closed (e.g. via VDE actuators, for example).

At time t0, conditions are not yet indicated to be met for obtaining the baseline data. In this example timeline, it may be understood that the controller scheduled the diagnostic for obtaining baseline intake air flow measurements such that the controller is scheduled to wake up at a determined time frame after the controller has been put to sleep. As the controller is still asleep (plot 840), conditions are not yet indicated to be met for obtaining the baseline intake air flow data (plot 805). The engine is stopped at time t0 (plot 810), and thus fuel injection to the engine is off (plot 815), and engine seed is 0 RPM (plot 825). The throttle (plot 820) is occupying a position the throttle was in when the engine was last shut down. The electric booster is off (plot 855), and thus with the engine off and the electric booster off, no flow is indicated via the MAF sensor (plot 830). It may be understood that the controller is asleep at time t0 (plot 840), and thus any flow in the intake may not be communicated to the controller anyway, however, MAF flow (plot 830) is indicated for reference. Furthermore, the wastegate (plot 845) is closed, the EGR valve (plot 850) is closed, and engine cylinders have not been commanded sealed (plot 860). Finally, GPF differential pressure sensor degradation (plot 835) is not indicated at time t0.

At time t1, the controller is awoken from sleep mode (plot 840), and thus conditions are indicated to be met for obtaining the baseline data (plot 805). Accordingly, at time t2, the throttle is commanded fully open (plot 820), the wastegate is commanded fully open (plot 845), the EGR valve is commanded fully open (plot 850), engine cylinders are commanded sealed (plot 860), and the electric booster is activated in reverse. Furthermore, while not explicitly illustrated, it may be understood that the electric booster bypass valve (e.g. 361) is commanded or maintained closed.

With the electric booster activated in reverse at time t2, between time t2 and t3 air flow being routed from the exhaust system to engine intake is monitored via the MAF sensor. As discussed above, MAF may be measured for a predetermined duration, and at time t3, the predetermined duration elapses. The MAF data is averaged to obtain an average MAF corresponding to baseline intake air flow. The averaged MAF data or baseline intake air flow is represented via dashed line 831. As discussed above, the baseline intake air flow may be stored at the controller.

With the baseline intake air flow obtained at time t3, the electric booster is commanded off, the wastegate is commanded closed, the EGR valve is commanded closed, engine cylinders are commanded unsealed, and the throttle is returned to its position prior to obtaining the baseline data. With the electric booster commanded off, and thus with air flow not being routed from the exhaust system to engine intake, air flow in engine intake as recorded via the MAF sensor returns to no flow between time t3 and t4.

At time t4, with the baseline intake air flow measurements obtained, conditions are no longer indicated to be met for obtaining the baseline data (plot 805), and accordingly, the controller is returned to sleep mode (plot 840). Between time t4 and t5, the controller is maintained asleep and the engine and electric booster are maintained off.

Turning now to FIG. 9, an example timeline 900 is shown, depicting the obtaining of test intake air flow measurements as discussed above with regard to FIG. 6. Specifically, timeline 900 depicts obtaining the test intake air flow measurements via rotating the engine unfueled in reverse. Timeline 900 includes plot 905, indicating whether conditions are met for obtaining the test intake air flow measurements (in order to determine whether the GPF is restricted to a level where cleaning is recommended). Timeline 900 further includes plot 910, indicating a status of the engine, over time. The engine may be off, rotating in reverse, or rotating in the forward direction. Timeline 900 further includes plot 915, indicating a status of fuel injection to the engine, over time. Timeline 900 further includes plot 920, indicating a position of an intake throttle, over time. The throttle may be fully open, fully closed, or may be somewhere in between. Timeline 900 further includes plot 925, indicating an engine speed, over time. Engine speed may be 0 RPM, or may be increased (+) with respect to 0 RPM. Timeline 900 further includes plot 930, indicating a MAF in engine intake, as monitored via a MAF sensor, over time. MAF may be either no flow, or may be increased (+) with respect to no flow. Timeline 900 further includes plot 935, indicating whether GPF differential pressure sensor degradation is indicated, or not, over time. Timeline 900 further includes plot 940, indicating a status of the vehicle controller, over time. The controller may be either asleep or awake. Timeline 900 further includes plot 945, indicating whether GPF regeneration, or cleaning, is scheduled, or not, over time.

At time t0, conditions are not yet indicated to be met for determining GPF restriction level (plot 905). In this example timeline, it may be understood that at time t0, GPF differential pressure sensor degradation is indicated (plot 935), and thus a test diagnostic is scheduled for determining GPF restriction, at a predetermined time point after a key-off event. In other words, the controller is scheduled to be awakened at a predetermined time after the key-off event, to conduct the diagnostic test. Accordingly, at time t0, the controller is asleep (plot 940). At time to, the engine is off (plot 910), and fuel injection to the engine is also off (plot 915). As the engine is stopped, engine speed is 0 RPM (plot 925). Furthermore, with the engine off, no flow is indicated in the engine intake (plot 930). While the controller is asleep, any flow in the engine intake may not be actively being monitored via the MAF sensor, yet the indication of no flow is represented for reference. Further, at time t0, the throttle is occupying a position it was in at the last key-off event (plot 920), and GPF regeneration is not currently scheduled (plot 945).

At time t1, the controller is awoken from sleep mode to conduct the test (plot 940). Accordingly, conditions are indicated to be met for determining GPF restriction (plot 905). With conditions being indicated to be met for conducting the test diagnostic for determining GPF restriction level, at time t2 the throttle is commanded fully open (plot 920), the engine is activated to be spun unfueled in reverse (plot 910), at a predetermined engine speed (plot 925). It may be understood, as discussed, that the predetermined engine speed may comprise the same speed that the engine was spun in order to obtain the baseline data.

With the engine rotating unfueled in reverse, between time t2 and t3, MAF is monitored in engine intake, via the MAF sensor (plot 930). It may be understood that MAF is monitored for a predetermined duration, which may comprise the same duration of time as MAF was monitored for obtaining baseline data via rotating the engine in reverse. At time t3, the predetermined duration elapses, and the MAF is averaged, to obtain average MAF for the duration MAF was monitored between time t2 and t3. Averaged MAF corresponding to the test diagnostic is represented via dashed line 931.

At time t3, the test MAF data (line 931), or test intake air flow, is compared via the controller, to the baseline MAF data (line 731), or baseline intake air flow. It may be understood that the difference between baseline intake air flow (line 731) and the test intake air flow (plot 931) is greater than the predetermined threshold difference, and thus the controller schedules the GPF regeneration (plot 945). In other words, by comparing the test intake air flow to the baseline intake air flow, it is indicated that the GPF is restricted to a level where it is desirable to conduct a cleaning, or regeneration procedure.

With the test intake air flow compared to the baseline intake air flow at time t3, the engine is commanded off (plot 910), and the throttle (plot 920) is returned to the position it was occupying prior to obtaining the test intake air flow measurements.

With the engine deactivated at time t3, engine speed decreases to 0 RPM between time t3 and t4, and accordingly, MAF decreases to no flow between time t3 and t4. At time t4, conditions are no longer indicated to be met for conducting the test diagnostic (plot 905), or in other words, determining the GPF restriction level, and thus, the controller is put to sleep (plot 940). Between time t4 and t5, the controller is maintained asleep with the engine off, and with GPF regeneration scheduled, the GPF regeneration procedure will be conducted responsive to conditions being met for doing so.

While not explicitly illustrated, it may be understood that under conditions where the engine is rotated in reverse in order to obtain baseline and test intake air flow measurements, and where the engine system includes an electric booster bypass valve, the electric booster bypass valve may be commanded open concurrently with the opening of the throttle, for rotating the engine in reverse to obtain such measurements.

Turning now to FIG. 10, another example timeline 1000 is shown, depicting the obtaining of test intake air flow measurements as discussed above with regard to FIG. 6. Specifically, timeline 1000 depicts obtaining the test intake air flow measurements via the use of an electric booster positioned in engine intake upstream of an intake throttle. Timeline 1000 includes plot 1005, indicating whether conditions are met for obtaining test intake air flow measurements, or in other words, determining a level of GPF restriction, over time. Timeline 1000 further includes plot 1010, indicating an engine status, over time. The engine may be either stopped, or may be rotating in reverse, or may be rotating in the forward direction. Timeline 1000 further includes plot 1015, indicating fuel injection status to the engine, over time. Timeline 1000 further includes plot 1020, indicating a position of an air intake throttle, over time. The throttle may be either open (e.g. fully open), closed (e.g. fully closed), or somewhere in between. Timeline 1000 further includes plot 1025, indicating an engine speed, over time. Engine speed may be either 0 RPM, or may be increased (+) with respect to 0 RPM. Timeline 1000 further includes plot 1030, indicating MAF in engine intake as monitored via a MAF sensor positioned in engine intake, over time. There may be either no flow, or flow may be increased (+) with respect to no flow. Timeline 1000 further includes plot 1035, indicating whether GPF differential pressure sensor degradation is indicated, or not, over time. Timeline 1000 further includes plot 1040, indicating whether the vehicle controller is asleep, or awake, over time. Timeline 1000 further includes plot 1045, indicating a status of a wastegate, over time. The wastegate may be either open (e.g. fully open), or closed (e.g. fully closed). Timeline 1000 further includes plot 1050, indicating a status of an EGR valve, over time. The EGR valve may either be open (e.g. fully open), or closed (e.g. fully closed), over time. Timeline 1000 further includes plot 1055, indicating a status of an electric booster (on or off), over time. In this example timeline, when the electric booster is on, it may be understood that the electric booster is being rotated in reverse. Timeline 1000 further includes plot 1060, indicating whether a GPF regeneration/cleaning is scheduled, or not, over time.

At time t0, conditions are not yet indicated to be met for determining the level of GPF restriction (plot 1005), or in other words, obtaining test intake air flow measurements. More specifically, in this example timeline, it may be understood that the controller is scheduled to wake at a predetermined time, in order to conduct the test diagnostic, and as the controller is asleep (plot 1040), conditions are not yet indicated to be met for conducting the test diagnostic. However, as the test diagnostic is scheduled, GPF differential pressure sensor degradation is indicated (plot 1035). The engine is off (plot 1010), and accordingly, fuel injection to the engine is off (plot 1015), and engine speed is 0 RPM (plot 1025). The throttle is in a position it was in at the last key-off event (plot 1020), and the electric booster is off (plot 1055). With the engine off and the electric booster off, there is no flow (no MAF) in the engine intake (plot 1030). As the controller is off at time t0, it may be understood that MAF may not be being communicated via the MAF sensor to the controller, however MAF is illustrated for reference. Furthermore, at time t0, the wastegate is closed (plot 1045), the EGR valve is closed (plot 1050), and GPF regeneration is not yet scheduled (plot 1060).

At time t1, the controller transitions to the awake status in order to conduct the test diagnostic (plot 1040). Accordingly, at time t1, conditions are indicated to be met for conducting the test diagnostic to determine a level of GPF restriction, or GPF loading state (plot 1005). With conditions being met at time t1 for conducting the test diagnostic, at time t2 the throttle is commanded fully open (plot 1020), the wastegate is commanded fully open (plot 1045), the EGR valve is commanded fully open (plot 1050), and the electric booster is commanded on in reverse. Due to space limitation with regard to FIG. 10, status of engine cylinders is not indicated, however it may be understood that at time t2, engine cylinders are commanded sealed. As discussed above, it may be understood that commanding engine cylinders sealed may include the controller sending a signal to VDE actuators, thus actuating closed intake and exhaust valves coupled to engine cylinders. Furthermore, while not explicitly illustrated, the electric booster bypass valve (e.g. 361) is commanded or maintained closed at time t2.

Between time t2 and t3, with the electric booster operating in reverse, air flow is routed from the exhaust system to engine intake, and such air flow is monitored in engine intake via the MAF sensor (plot 1030). MAF is monitored for a predetermined duration, the predetermined duration comprising a duration of time that is the same as that for obtaining the baseline intake air flow measurements via rotating or in other words, operating the electric booster in reverse. At time t3, the predetermined duration elapses, and MAF monitored between time t2 and t3 is averaged to obtain average MAF for the test diagnostic, as represented by line 1031. Furthermore, at time t3, the average MAF corresponding to the test diagnostic, or test intake air flow, is compared to the average MAF corresponding to the baseline diagnostic, or baseline intake air flow, represented by line 831. In this example timeline, it may be understood that the baseline intake air flow (line 831) differs from the test intake air flow (plot 1031) by greater than the predetermined threshold difference, and thus, GPF regeneration is scheduled (plot 1060).

At time t3, as the predetermined duration has elapsed, the throttle is returned to the position it was in prior to conducting the test diagnostic (plot 1020), the wastegate is commanded closed (plot 1045), the EGR valve is commanded closed (plot 1050), and the electric booster is commanded off (plot 1055). While not explicitly illustrated due to space constraints, it may be understood that the engine cylinders are commanded unsealed at time t3.

With the electric booster off, MAF decreases to no flow between time t3 and t4 (plot 1030). At time t4, the controller is returned to sleep mode (plot 1040), and conditions are no longer indicated to be met for conducting the test diagnostic for determining the level of GPF restriction (plot 1005). Between time t4 and t5, the controller is maintained asleep, and the GPF cleaning may be conducted responsive to conditions being met for doing so.

As discussed above, the GPF cleaning routine scheduled as discussed with regard to example timelines 900 and 1000 may include activating the engine to combust air and fuel, and may further include controlling fueling and/or spark such that the engine runs lean. The lean engine operation may direct oxygen and hot exhaust air to the GPF for regeneration. Thus, such a procedure, once scheduled, may be conducted responsive to conditions being met for doing so. Furthermore, once the cleaning procedure has been conducted, verification as to whether the GPF was effectively cleaned, may be conducted. More specifically, if the test diagnostic comprised rotating the engine in reverse to route air flow from the exhaust system to engine intake, then the engine may again be rotated in reverse (responsive to conditions being met for doing so), according to method 600, and MAF in the engine intake may be compared to the previously determined baseline MAF (established under conditions where the engine was rotated in reverse). If MAF recorded after the GPF regeneration procedure is substantially equivalent (e.g. within 5%) to the baseline MAF, then it may be indicated that the GPF cleaning procedure was effective. At such a point, a baseline intake air flow diagnostic may be scheduled, such that the baseline intake air flow may be obtained with a clean GPF. If the cleaning routine did not effectively clean the GPF, then the cleaning procedure may be repeated any number of times in order to effectively clean the GPF.

In another example, if the test diagnostic comprised rotating the electric booster in reverse to route air flow from the exhaust system to engine intake, then the electric booster may again be rotated in reverse (responsive to conditions being met for doing so), according to method 600, and MAF in the engine intake may be compared to the previously determined baseline MAF (established under conditions where the electric booster was rotated in reverse). Again, if MAF recorded after the GPF regeneration procedure is substantially equivalent (e.g. within 5%) to the baseline MAF, then it may be indicated that the GPF cleaning routine was effective. At such a point, another baseline intake air flow diagnostic may be scheduled, such that the baseline intake air flow may be obtained with a clean GPF. Similar to that discussed above, if the cleaning routine did not effectively clean the GPF, then the cleaning procedure may be repeated any number of times in order to effectively clean the GPF.

In this way, under conditions where the GPF differential pressure sensor is indicated to be degraded or otherwise not functioning as desired, GPF restriction may be effectively determined, and cleaning routines scheduled under conditions where GPF restriction greater than a predetermined level is indicated. In doing so, engine operation may be improved, and engine degradation related to exhaust system restriction (due to a loaded GPF), may be reduced.

The technical effect is to recognize that MAF in engine intake may serve as a readout of GPF restriction, under conditions where the GPF differential pressure sensor is degraded or otherwise not functioning as desired or expected. More specifically, the technical effect is to recognize that baseline MAF recorded under conditions where it is known that the GPF is clean (e.g. loaded less than a predetermined threshold loading state), may be compared to test MAF recorded under conditions where the GPF differential pressure sensor is known/inferred to be degraded, in order to infer GPF restriction level. Thus, a further technical effect is to recognize that such MAF (baseline and test) may be obtained via rotation of the engine in reverse, or via rotation of an electric booster positioned in engine intake, in reverse. A still further technical effect is to recognize that, under conditions where the electric booster is rotated in reverse, it may be desirable to bypass the engine and turbine, via sealing engine cylinders, and commanding open the EGR valve and wastegate. Yet another technical effect is to recognize that, the baseline measurements of intake air flow may vary as a function of loading state of an intake air filter. Thus, a technical effect is to age the baseline measurements via a model stored at the controller, such that baseline measurements of intake air flow reflect a current state of the intake air filter, at a time when test measurements of intake air flow are conducted. Such "aging" of the baseline measurements may be based on air flow inducted into the engine and estimates of dust/debris that may accumulate on the intake air filter as a result.

The systems described herein, and with reference to FIGS. 1-4B, along with the methods described herein, and with reference to FIGS. 5-6, may enable one or more systems and one or more methods. In one example, a method comprises regenerating a particulate filter positioned in an exhaust system of an engine of a vehicle in response to a first air-flow in an intake of the engine differing from a second air-flow in the intake of the engine by at least a threshold amount, the air flows including air-flow routed from the exhaust system to an engine intake through the engine. In a first example of the method, the method may further include wherein the first air-flow comprises a baseline intake air-flow obtained under conditions where the particulate filter is known to be loaded less than a threshold loading state. A second example of the method optionally includes the first example, and further includes wherein the first air-flow is a function of a loading state of an intake air filter, and where the baseline air-flow is aged according to a model of air inducted to the engine and/or dust or other particulate matter trapped by the intake air filter, over time. A third example of the method optionally includes any one or more or each of the first through second examples, and further includes wherein the second air-flow comprises a test intake air-flow and is obtained under conditions where a differential pressure sensor coupled to the particulate filter is known to be degraded or otherwise not functioning as desired or expected. A fourth example of the method optionally includes any one or more or each of the first through third examples, and further includes wherein the first air-flow and the second air-flow are obtained via rotating the engine unfueled, in reverse. A fifth example of the method optionally includes any one or more or each of the first through fourth examples, and further includes wherein the first air-flow and the second air-flow are obtained via rotating an electric booster positioned in the engine intake in reverse. A sixth example of the method optionally includes any one or more or each of the first through fifth examples, and further includes wherein rotating the electric booster in reverse further comprises routing the first air-flow and the second air-flow around the engine and a turbine positioned in the exhaust system. A seventh example of the method optionally includes any one or more or each of the first through sixth examples, and further comprises commanding fully open a throttle positioned in the engine intake just prior to obtaining the first air-flow and the second air-flow. An eighth example of the method optionally includes any one or more or each of the first through eighth examples, and further includes wherein the particulate filter comprises one of a gasoline particulate filter, or a diesel particulate filter. A ninth example of the method optionally includes any one or more or each of the first through eighth examples, and further comprises obtaining the first air-flow and the second air-flow under conditions where the vehicle is unoccupied and/or operating autonomously.

Another example of a method comprises routing a first air-flow from an exhaust system of an engine to an intake of the engine to obtain a baseline intake air-flow under conditions where a particulate filter positioned in the exhaust system is loaded below a threshold loading state; routing a second air-flow from the exhaust system of the engine to the intake of the engine to obtain a test intake air-flow under conditions independent of a loading state of the particulate filter; and conducting a regeneration procedure of the particulate filter in response to the baseline intake air-flow differing by at least a threshold amount from the test intake air-flow. In a first example of the method, the method further includes wherein routing the first air-flow and routing the second air-flow further comprises rotating the engine in reverse, unfueled. A second example of the method optionally includes the first example, and further includes wherein routing the first air-flow and routing the second air-flow further comprises operating an electric booster positioned in the intake of the engine in reverse, where operating the electric booster in reverse further comprises routing the first air-flow and the second air-flow around the engine and around a turbine positioned in the exhaust system. A third example of the method optionally includes any one or more or each of the first through second examples, and further includes wherein routing the first air-flow and the second air-flow around the engine and around the turbine further comprises commanding cylinders of the engine sealed, commanding open an exhaust gas recirculation valve positioned in an exhaust gas recirculation passage, and commanding open a wastegate positioned in a wastegate passage, the wastegate passage positioned in the exhaust system and configured to bypass the turbine. A fourth example of the method optionally includes any one or more or each of the first through third examples, and further comprises updating the baseline intake air-flow subsequent to obtaining the baseline intake air-flow and prior to obtaining the test intake air-flow, where updating the baseline intake air-flow includes modeling the baseline intake air-flow as a function of an amount of air and other particulate matter ingested into the engine via an intake air filter, over time. A fifth example of the method optionally includes any one or more or each of the first through fourth examples, and further includes wherein obtaining the baseline intake air-flow and obtaining the test intake air-flow includes monitoring the first air-flow and the second air-flow via a mass air flow sensor positioned in the intake of the engine; and wherein routing the first air-flow and the second air-flow further comprises commanding fully open a throttle positioned in the intake of the engine.

A system for a hybrid vehicle comprises an engine including an intake and an exhaust system; a particulate filter positioned in the exhaust system, the particulate filter including a differential pressure sensor configured to indicate a loading state of the particulate filter; an electric motor, capable of rotating the engine unfueled; a mass air flow sensor, positioned in the intake of the engine; a throttle positioned in the intake of the engine; and a controller with computer readable instructions stored in non-transitory memory that, when executed, cause the controller to: responsive to an indication that the loading state of the particulate filter is below a predetermined threshold loading state, route a first air-flow from the exhaust system to the intake of the engine and record a baseline intake air-flow via the mass air flow sensor; at a later time, under conditions where the differential pressure sensor is indicated to be degraded and where the loading state of the particulate filter is independent of the differential pressure sensor reading, route a second air-flow from the exhaust system to the intake of the engine and record a test intake air-flow via the mass air flow sensor, where routing the first air-flow and the second air-flow includes commanding fully open the throttle; and conduct a regeneration procedure of the particulate filter in response to the baseline intake air-flow differing by at least a threshold amount from the test intake air-flow. In a first example of the system, the system further includes wherein the controller stores further instructions to route the first air-flow and route the second air-flow via rotating the engine unfueled via the motor. A second example of the system optionally includes the first example, and further comprises an electric booster positioned in the intake of the engine, upstream of the throttle; an exhaust gas recirculation valve positioned in an exhaust gas recirculation passage coupling the exhaust system to the intake of the engine; a wastegate positioned in a wastegate passage in the exhaust system, the wastegate passage configured to route fluid flow around a turbine positioned in the exhaust system; an electric booster bypass valve positioned in the intake of the engine upstream of the throttle; variable displacement engine actuators for sealing cylinders of the engine; and wherein the controller stores further instructions to route the first air-flow and route the second air-flow via operating the electric booster in reverse with the exhaust gas recirculation valve commanded open, the wastegate commanded open, the electric booster bypass valve commanded closed, and the cylinders of the engine sealed. A third example of the system optionally includes any one or more or each of the first through second examples, and further comprises one or more of seat load cells, door sensing technology, and/or onboard cameras; and wherein the controller stores further instructions to route the first air-flow and route the second air-flow under conditions where the hybrid vehicle is indicated to be unoccupied, where occupancy state is indicated via one or more of the seat load cells, door sensing technology and/or onboard cameras.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
regenerating a particulate filter positioned in an exhaust system of an engine of a vehicle in response to a first air-flow in an intake of the engine differing from a second air-flow in the intake of the engine by at least a threshold amount, the air flows including air-flow routed from the exhaust system to an engine intake through the engine.

2. The method of claim 1, wherein the first air-flow comprises a baseline intake air-flow obtained under conditions where the particulate filter is known to be loaded less than a threshold loading state.

3. The method of claim 2, wherein the first air-flow is a function of a loading state of an intake air filter, and where the baseline air-flow is aged according to a model of air inducted to the engine and/or dust or other particulate matter trapped by the intake air filter, over time.

4. The method of claim 1, wherein the second air-flow comprises a test intake air-flow and is obtained under conditions where a differential pressure sensor coupled to the particulate filter is known to be degraded or otherwise not functioning as desired or expected.

5. The method of claim 1, wherein the first air-flow and the second air-flow are obtained via rotating the engine unfueled, in reverse.

6. The method of claim 1, wherein the first air-flow and the second air-flow are obtained via rotating an electric booster positioned in the engine intake in reverse.

7. The method of claim 6, wherein rotating the electric booster in reverse further comprises routing the first air-flow and the second air-flow around the engine and a turbine positioned in the exhaust system.

8. The method of claim 1, further comprising commanding fully open a throttle positioned in the engine intake just prior to obtaining the first air-flow and the second air-flow.

9. The method of claim 1, wherein the particulate filter comprises one of a gasoline particulate filter, or a diesel particulate filter.

10. The method of claim 1, further comprising obtaining the first air-flow and the second air-flow under conditions where the vehicle is unoccupied and/or operating autonomously.

* * * * *